(12) United States Patent
Niles et al.

(10) Patent No.: US 8,621,735 B2
(45) Date of Patent: Jan. 7, 2014

(54) CONDUCTOR COVER APPLICATOR

(75) Inventors: Martin S. Niles, Stony Plain (CA); Leo Morin, Edmonton (CA); Keith I. Yeats, Edmonton (CA); Robert A. Nissen, Edmonton (CA)

(73) Assignee: Cantega Technologies Inc., Edmonton, Alberta (CA)

(*) Notice: Subject to any disclaimer, the term of this patent is extended or adjusted under 35 U.S.C. 154(b) by 329 days.

(21) Appl. No.: 12/903,534

(22) Filed: Oct. 13, 2010

(65) Prior Publication Data

US 2011/0083783 A1    Apr. 14, 2011

Related U.S. Application Data

(60) Provisional application No. 61/285,304, filed on Dec. 10, 2009.

(30) Foreign Application Priority Data

Oct. 13, 2009   (CA) ..................................... 2679992

(51) Int. Cl.
 *B25B 27/00* (2006.01)
(52) U.S. Cl.
 USPC .............................................. 29/270; 29/278
(58) Field of Classification Search
 USPC ......... 29/857, 270, 278, 868, 872; 72/413.16, 72/416; 156/53, 54, 538; 174/5 R, 40 R, 174/135, 156
 See application file for complete search history.

(56) References Cited

U.S. PATENT DOCUMENTS

| 1,485,994 | A | | 3/1924 | Salisbury |
|---|---|---|---|---|
| 3,017,905 | A | * | 1/1962 | Klein ............................ 140/113 |
| 3,133,984 | A | | 5/1964 | Farough et al. |
| 3,600,784 | A | | 8/1971 | Propst et al. |
| 3,900,698 | A | | 8/1975 | Yotsugi |
| 5,796,032 | A | | 8/1998 | Hadley |
| 6,227,251 | B1 | | 5/2001 | Ahn et al. |
| 6,730,852 | B1 | | 5/2004 | Puigcerver et al. |

OTHER PUBLICATIONS

"Outage Protection", excerpt from Salisbury product catalogue, p. D4-5, at least as early as 2006.
"2007 Outage Protection", Salisbury product catalogue, p. 1-32, at least as early as 2007.
Salisbury product catalogue, 142 pages, at least as early as 2006.
International Search Report and Written Opinion issued for Applicant's corresponding PCT application, Canadian Intellectual Property Office, mailed Feb. 3, 2011.

* cited by examiner

*Primary Examiner* — Thiem Phan
(74) *Attorney, Agent, or Firm* — Anthony R. Lambert

(57) ABSTRACT

An applicator for applying a dielectric tubular conductor cover to a cable, the conductor cover being split longitudinally to define a first longitudinal edge and a second longitudinal edge, the applicator comprising: a head having a separator shaped to contact, in operation of the applicator, an interior surface of the conductor cover to spread open the first longitudinal edge and the second longitudinal edge along a portion of the conductor cover to allow the portion of the conductor cover to be applied to a cable.

30 Claims, 23 Drawing Sheets

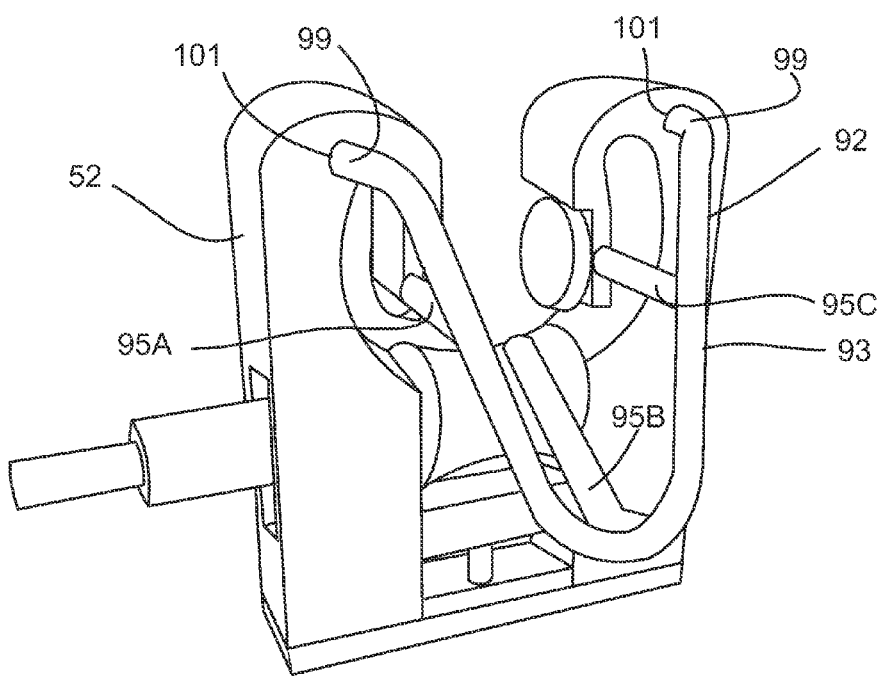
FIG. 11A
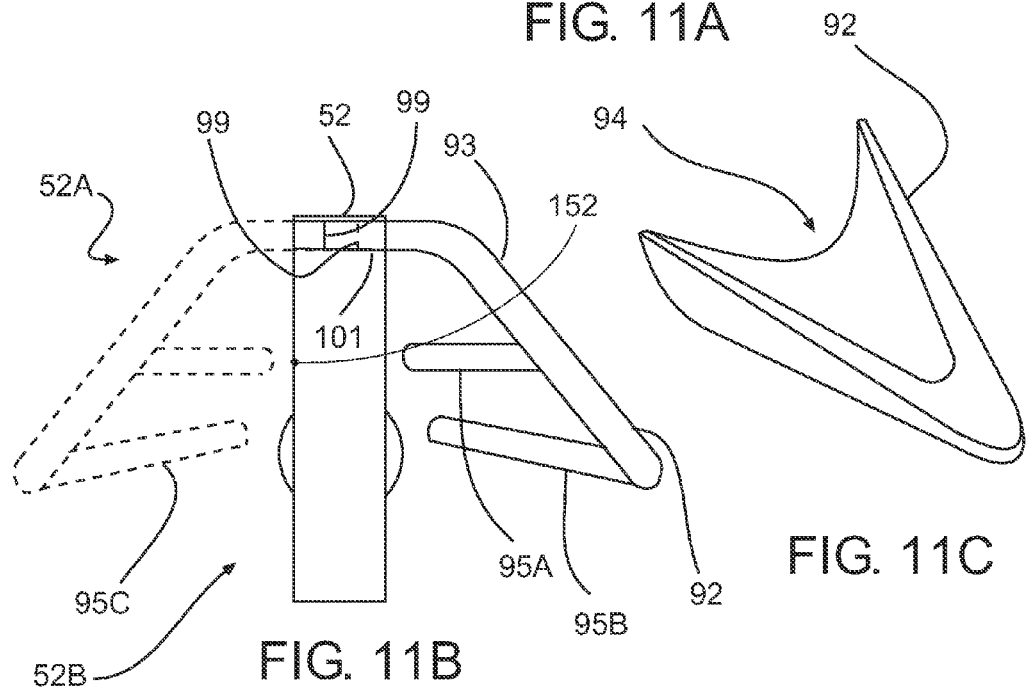
FIG. 11B
FIG. 11C

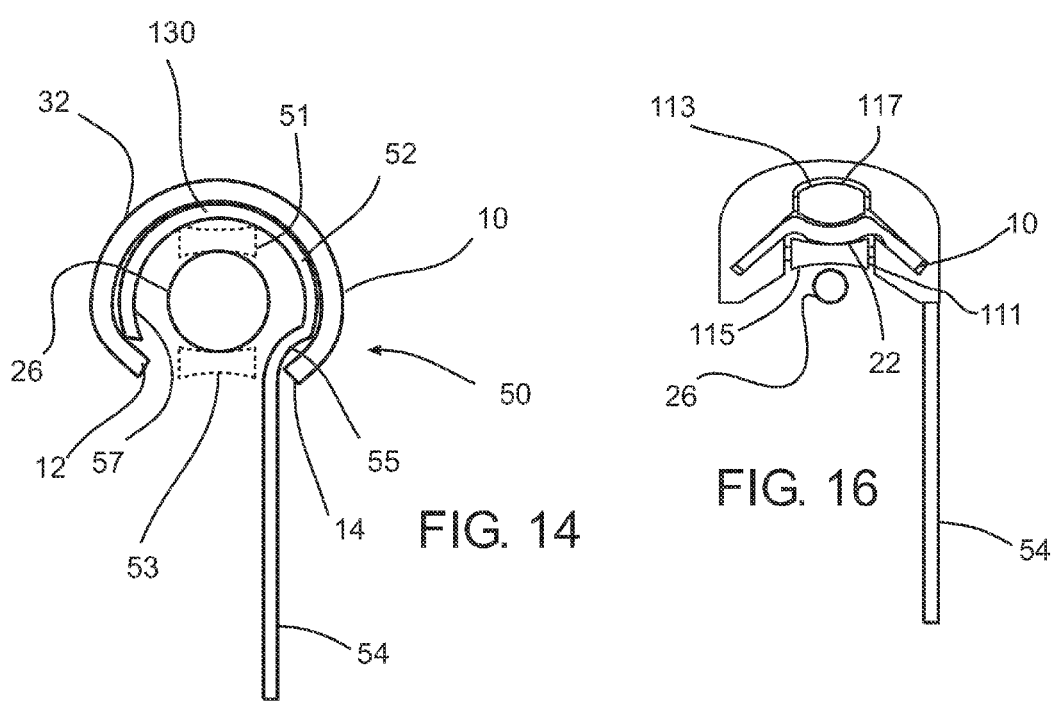
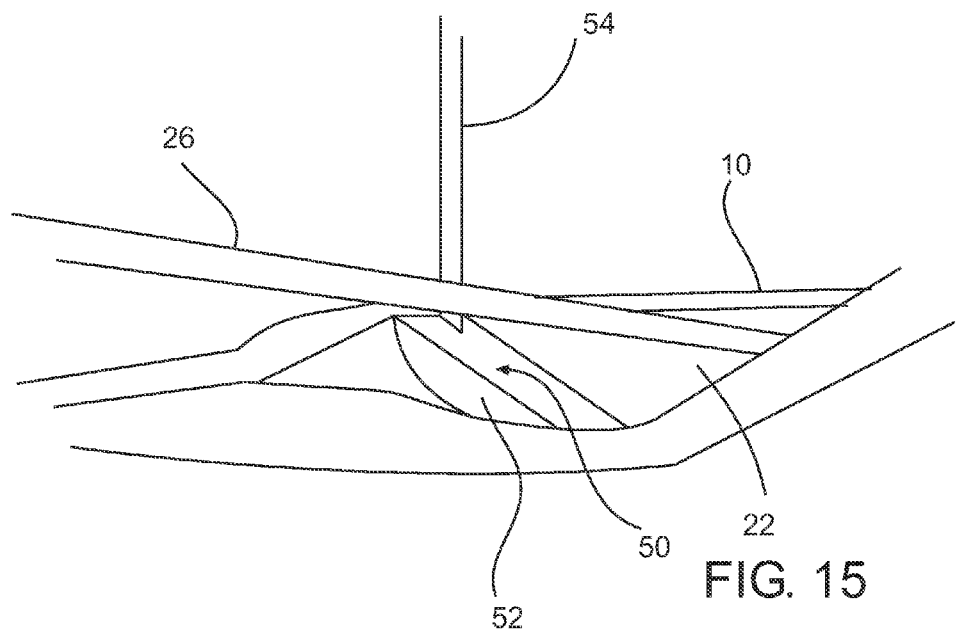

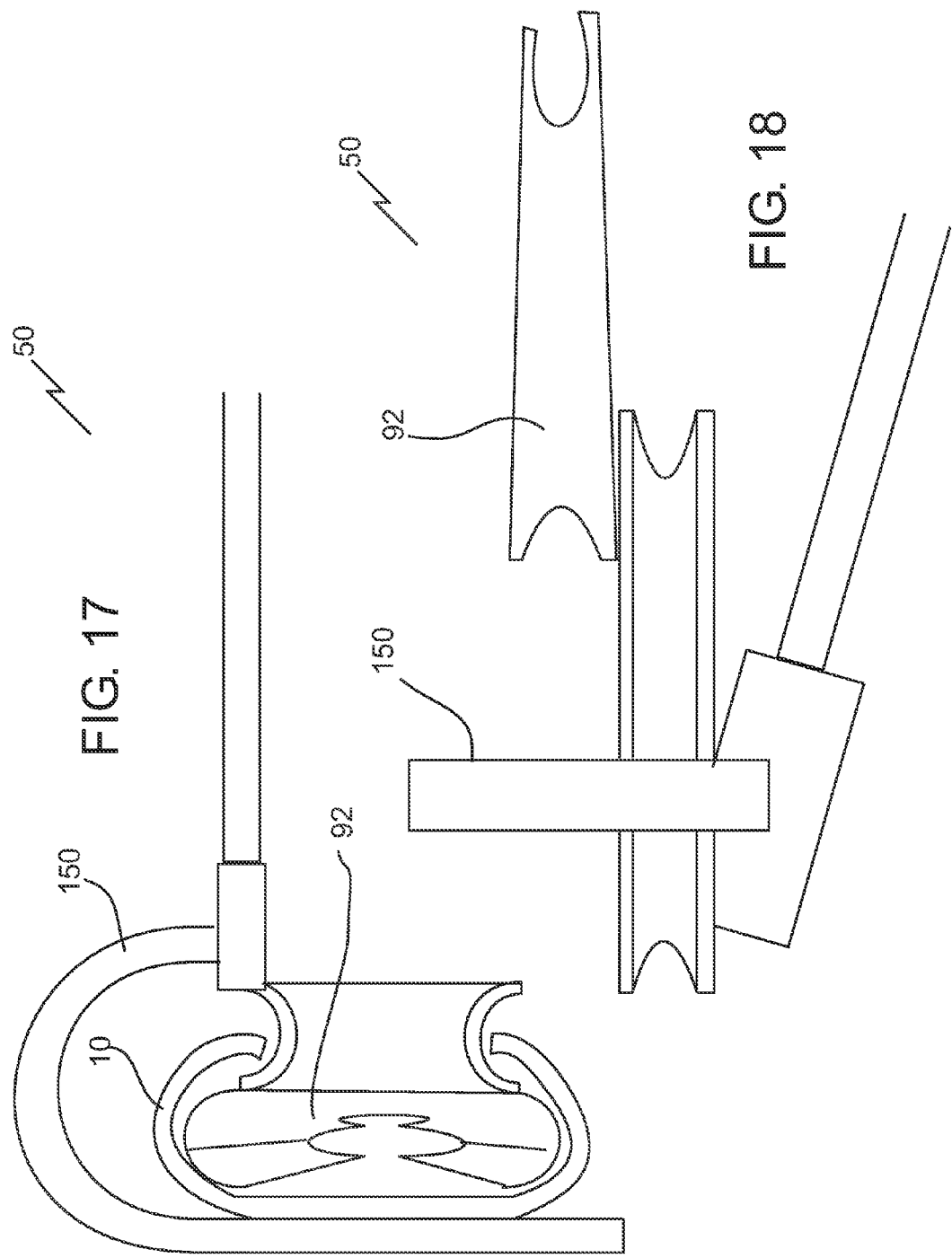

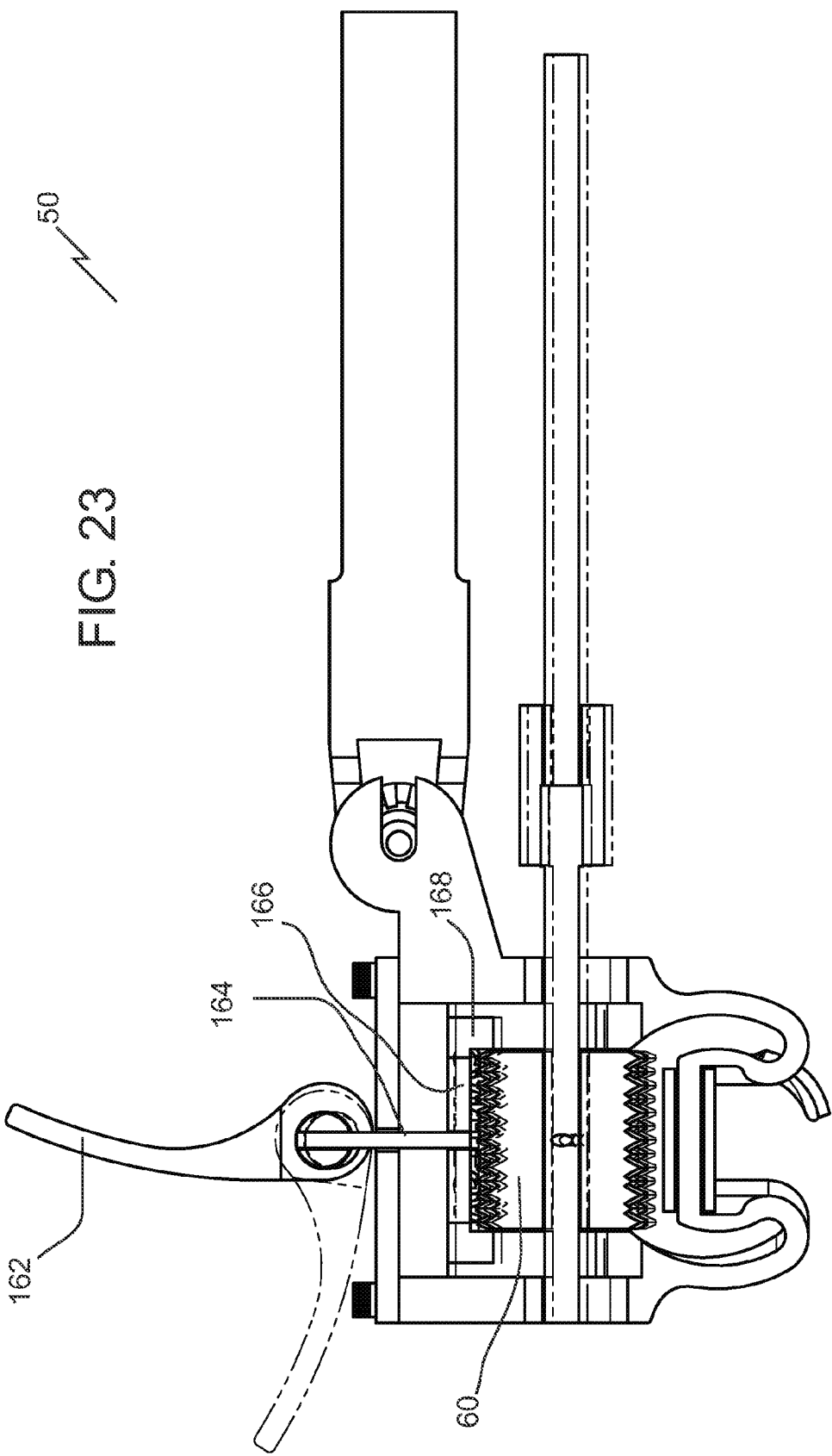

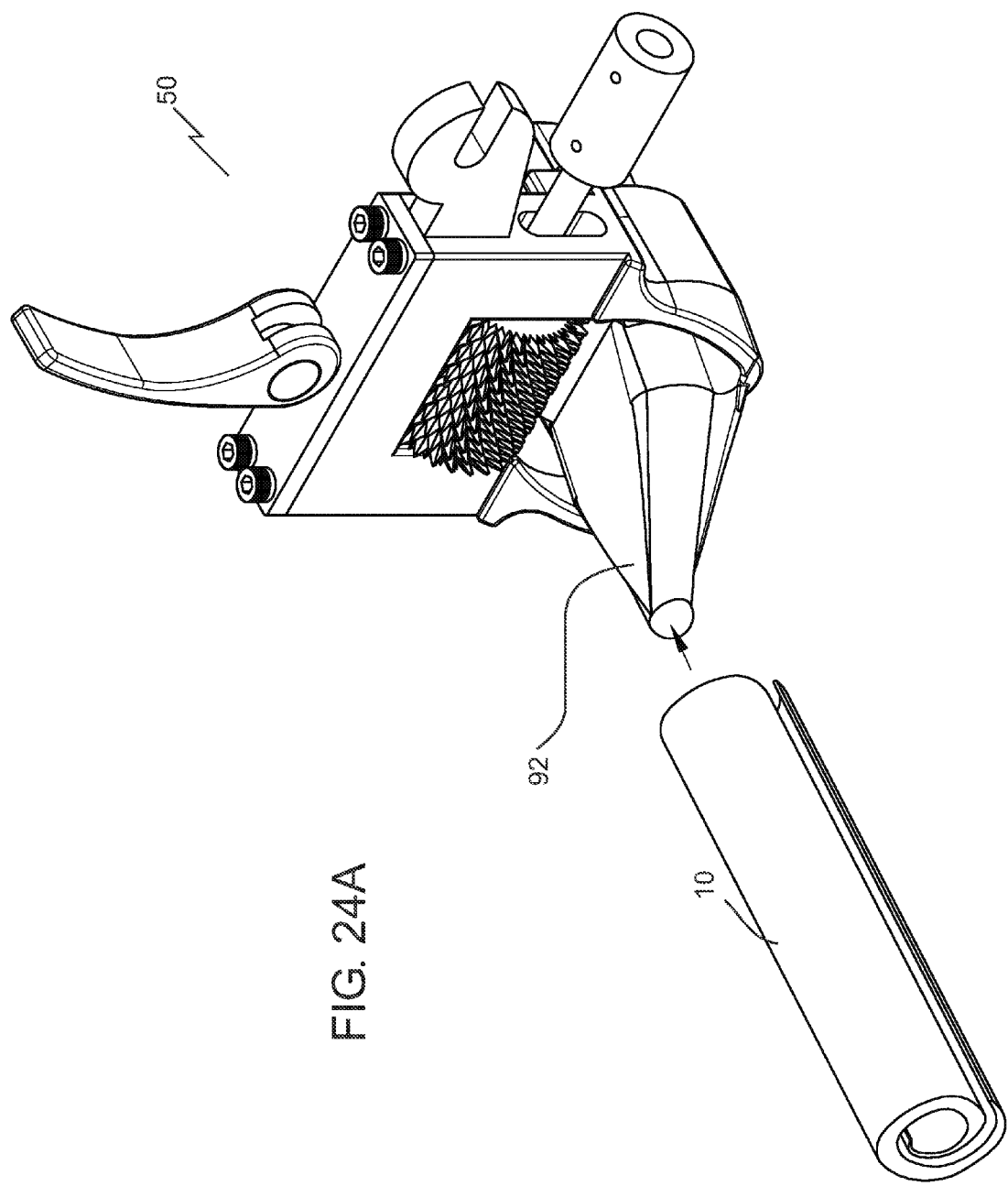

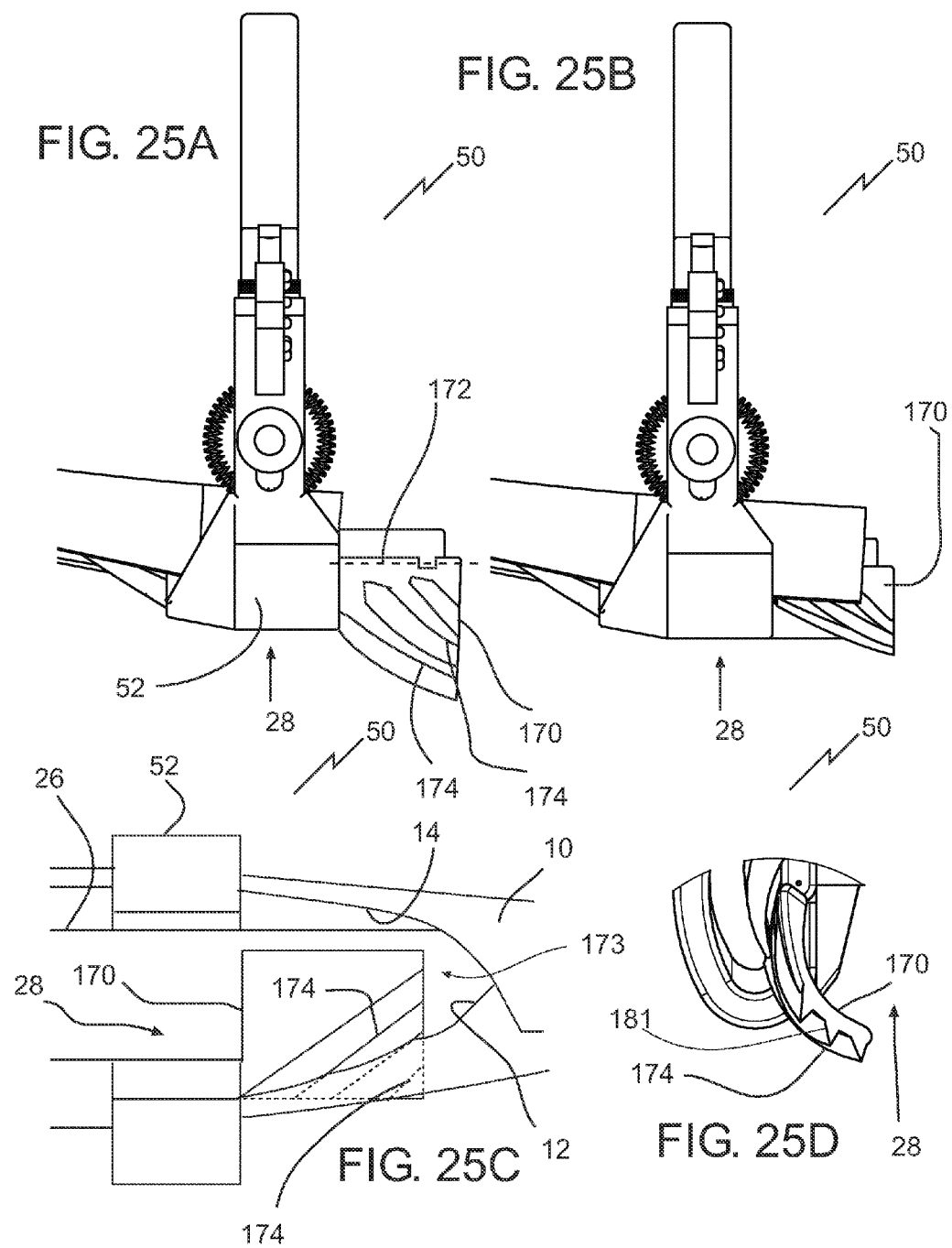

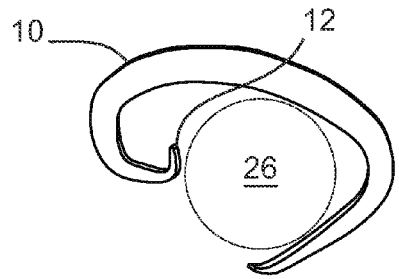
FIG. 26A
FIG. 26B
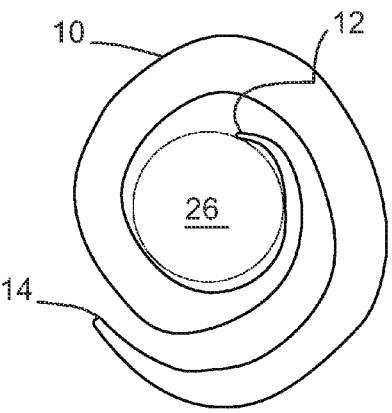
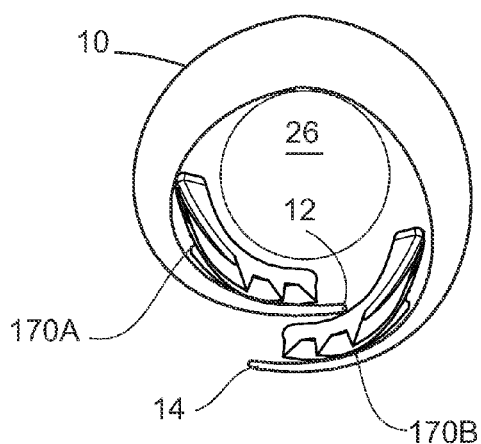
FIG. 28
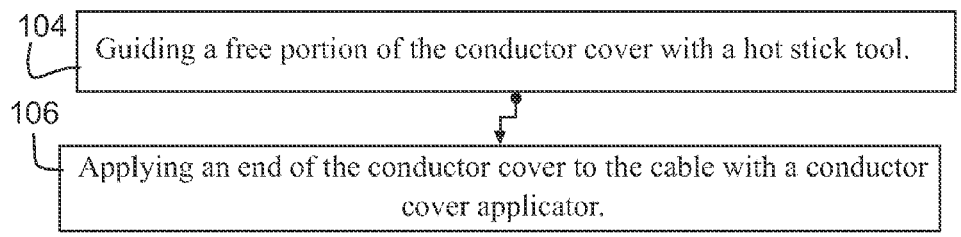
FIG. 27

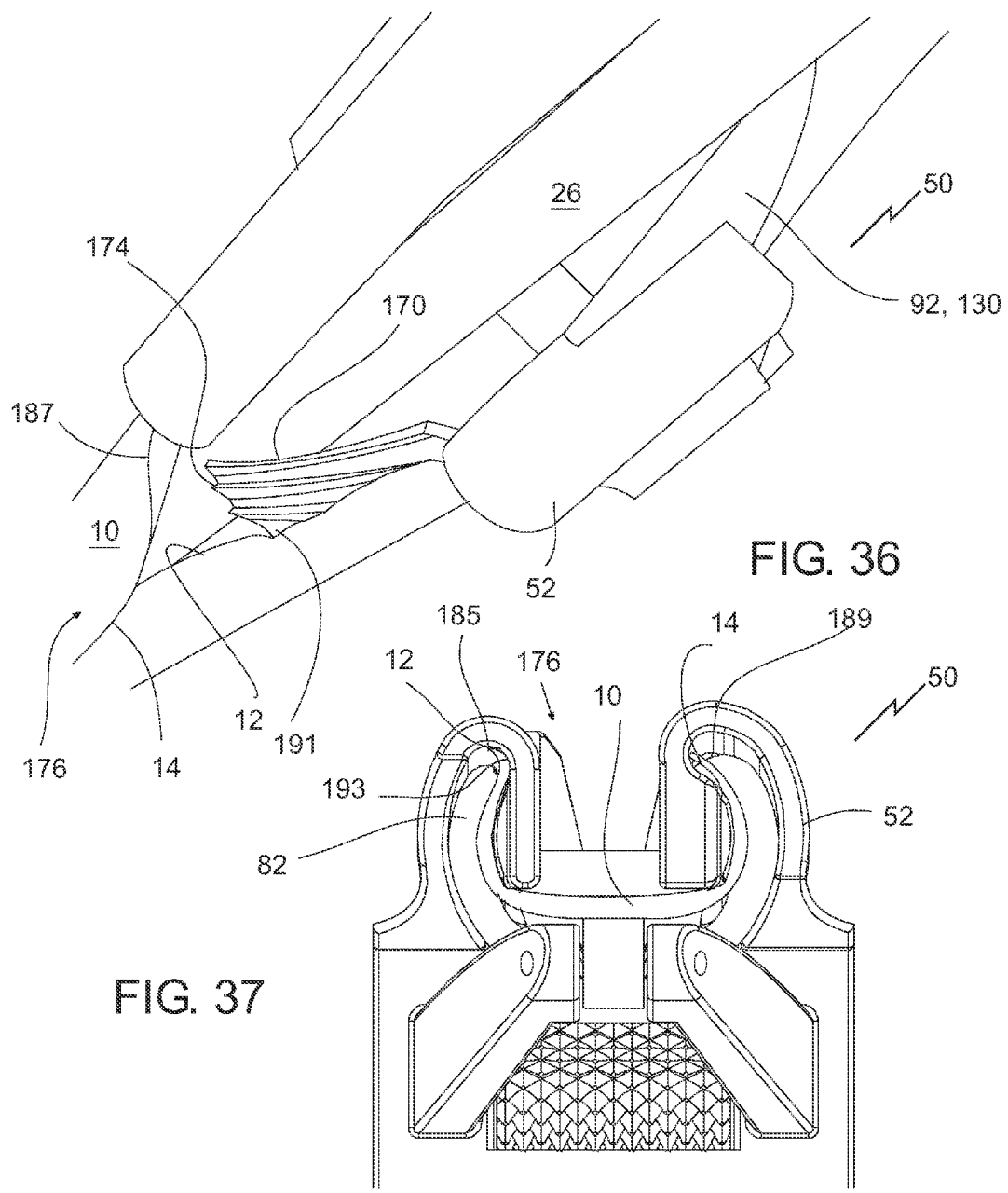

CONDUCTOR COVER APPLICATOR

CROSS-REFERENCE TO RELATED APPLICATIONS

This application claims the benefit under 35 USC 119 of U.S. provisional application Ser No. 61/285,304 filed Dec. 10, 2009, and Canadian patent application Ser. No. 2,679,992 filed Oct. 13, 2009.

TECHNICAL FIELD

This document relates to the field of applying conductor cover, and more specifically to applying conductor cover on energized cables.

BACKGROUND

Conductor cover may be installed over cables in order to protect energized cables from wildlife and other incidental contact that may cause power system faults or outages. Conductor covers such as Instant Insulation or Stinger Covers sold by Salisbury are examples of the type of cover used in the industry for this purpose. There are three basic work methods for applying conductor cover: application to a grounded (de-energized) system; application by a worker using rubber gloves to apply the conductor cover to a system that could be energized or de-energized; and application by a worker using a hotstick to apply the conductor cover to an energized or de-energized system. The hotstick method is the most desirable because it eliminates the risks to workers of working in the vicinity of energized components such as lightning arrestors and fused disconnects. Unfortunately, applying conductor cover over a cable is often difficult to accomplish, as the cover may be resilient in nature and awkward to handle. Also, the conductor is often free to move during installation and this can pose a risk to the individual applying the cover and/or to the energized system.

One type of applicator used in the industry for applying such cover on energized conductor is the 2494 applicator, also sold by Salisbury. The 2494 applicator has two rigid closely-parallel prongs attached to one another at both ends. To install the conductor cover on a cable, one end of the Instant Insulation or other conductor cover is first flattened and inserted in between the applicator prongs. The prongs are then rolled to coil the insulation around the prongs. The prongs hold the cover flat, and a user can then place the flattened cover over a cable by unrolling the cover onto the cable.

SUMMARY

An applicator is disclosed for applying a tubular conductor cover to a cable, the conductor cover being split longitudinally to define a first longitudinal edge and a second longitudinal edge, the applicator comprising: a head having a separator shaped to contact, in operation of the applicator, an interior surface of the conductor cover to spread open the first longitudinal edge and the second longitudinal edge along a portion of the conductor cover to allow the portion of the conductor cover to be applied to a cable.

A method is also disclosed of applying tubular conductor cover to a cable, the conductor cover being split longitudinally to define a first longitudinal edge and a second longitudinal edge, the method comprising: spreading open the first longitudinal edge and the second longitudinal edge of a portion of the conductor cover with a separator on a head, the separator contacting an interior surface of the conductor cover; and applying a length of conductor cover to the cable through the head.

A method is also disclosed of applying tubular conductor cover to a cable, the conductor cover being split longitudinally to define a first longitudinal edge and a second longitudinal edge, the method comprising: guiding a free portion of the conductor cover with a hot stick tool, which may include a specialized guide attachment (not shown); and applying an end of the conductor cover to the cable with a conductor cover applicator.

An applicator is also disclosed for applying a tubular conductor cover, such as a resilient conductor cover, to a cable, the conductor cover being split longitudinally to define a first longitudinal edge and a second longitudinal edge, the applicator comprising: a head having a separator shaped to contact, in operation of the applicator, an interior surface of the conductor cover to maintain the first longitudinal edge and the second longitudinal edge open along a portion of the conductor cover to allow the head to be positioned such that a cable is located within the portion of the conductor cover.

A method is also disclosed of installing tubular conductor cover over a cable, the conductor cover being split longitudinally to define a first longitudinal edge and a second longitudinal edge, the method comprising: spacing the first longitudinal edge and the second longitudinal edge of a portion of the conductor cover open using a separator contained on a head, the separator contacting an interior surface of the conductor cover; positioning the head over a cable, for example using a handle, to locate the cable next to the interior surface of the portion of the conductor cover. A length of conductor cover is then applied to the cable by guiding the head along the cable, for example using the handle.

An applicator is also disclosed for applying a tubular conductor cover to a cable, the conductor cover being split longitudinally to define a first longitudinal edge and a second longitudinal edge, the applicator comprising: a head having a separator and a roller element, the separator shaped to contact, in operation of the applicator, an interior surface of the conductor cover to maintain the first longitudinal edge and the second longitudinal edge open along a portion of the conductor cover and to allow the head to be positioned such that the cable is within the portion of the conductor cover; the roller element having a roller surface for contacting and guiding the conductor cover through the head.

In various embodiments, there may be included any one or more of the following features: The head may comprise a roller element having a roller surface for contacting and guiding the conductor cover through the head in operation. The roller surface may comprise conductor cover gripping element. The applicator may have a biasing mechanism for biasing the roller element towards the conductor cover in use. The applicator may have an actuator lever for advancing and retracting the roller element towards and away from, respectively, the cover in use. The roller surface may be positioned for contacting an exterior surface of the conductor cover to hold the portion of the conductor cover against the separator. The roller surface may be one or more of at least partially concave or at least partially convex. The roller surface may be positioned for contacting the interior surface of the portion of conductor cover. At least one roller element may be connected for rotation to a drive system for one or both of driving and pulling the conductor cover through the head. A drive system may be present for one or both of driving and pulling the conductor cover through the head. The drive system may comprise a drive shaft made at least partially out of dielectric material. The head and the separator may define a channel contoured to fit the portion of the conductor cover. The channel may be a U or W-channel. The channel may comprise one or more spacer elements. One or more spacer elements may be adjustable. The channel may be shaped to impart reverse curl on one or more of the first longitudinal edge and the second longitudinal edge at a cover exit end of the head. The applicator may have a handle for positioning the head. The handle may comprise a hot stick stock made at least partially of a dielectric material. The head may be one or more of connected to, pivotally connected to, and suspended from, the handle. The separator may converge inwardly to define a wedge element for spreading the first longitudinal edge and the second longitudinal edge apart during axial movement of the conductor cover through the head. The separator may comprise two or more separating elements spaced to contact the interior surface of the conductor cover. A cable passage may be at least partially defined by the separator. A gate may be provided, the gate having an at least partially closed position and being shaped to guide, when in the at least partially closed position, the first longitudinal edge at least partially across the cable passage and under or over the second longitudinal edge as the conductor cover exits the applicator. The gate may comprise one or more cover edge guide ridges for restricting the first longitudinal edge from curling back on itself. The gate may be biased to close or partially close in the presence of the conductor cover. The gate may comprise one or more cover edge guide ridges. One or more of the cover edge guide ridges may be angled across the cable passage with increasing distance across the cable passage towards an exit end of the gate. The gate may be a first gate and the applicator may further comprise a second gate having an at least partially closed position and being shaped to guide, when in the at least partially closed position, the second longitudinal edge at least partially across the cable passage as the conductor cover exits the applicator, in which the first gate and the second gate overlap when in the respective at least partially closed positions. A cover exit guide may be provided for in use pressing the conductor cover towards the cable upon exit from the applicator. The cover guide may comprise a roller element. The applicator may be provided in combination with a hot stick tool for maintaining control over a free portion of the conductor cover positioned upstream of the applicator in use. The cover may be provided in combination with conductor cover that is split longitudinally to have an overlapping portion defined by the first longitudinal edge and the second longitudinal edge. The separator may converge inwardly at a cover exit end of the head for closing the first longitudinal edge and the second longitudinal edge together about the cable during axial movement of the conductor cover through the head. Applying may comprise rolling the conductor cover through the head using one or more roller elements. The conductor cover may be secured to the cable using fasteners. The head may be connected to a handle that comprises a hot stick made at least partially of a dielectric material, and in which applying comprises applying the conductor cover to an energized cable by a user outside the limits of approach. Applying may comprise one or more of driving and pulling the conductor cover through the head. Applying may comprise guiding the head along the cable. The cover may be clamped against the separator or another part of the applicator head prior to application. The applicator may comprise a handle for positioning the head. The handle may comprise a hot stick stock made at least partially of a dielectric material. The hot stick may be for applying conductor cover to energized cable outside of the limits of approach. A roller element may be provided on the head with a roller surface for contacting an outer surface of the conductor cover to hold the portion of the conductor cover against the separator and for guiding the conductor cover through the head. The head may be constructed wholly or partially of a dielectric material. The separator may comprise two or more separating elements spaced to contact the interior surface of the conductor cover. The head may comprise a roller element having a roller surface for contacting and guiding the conductor cover through the head in operation. The roller element may comprise one or more roller elements, the roller surface of at least one roller element being positioned for contacting an outer surface of the conductor cover to hold the portion of the conductor cover against the separator, and the roller surface of at least another roller element being positioned for contacting the interior surface of the portion of conductor cover.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 11A is a perspective view of an embodiment of the head incorporating a wire rack wedge element.

FIG. 11B is a side elevation view, in section, of the head of FIG. 11A with the wedge element installed in one orientation in solid lines and a reversed orientation superimposed in ghost lines.

FIG. 11C is a perspective view that illustrates another embodiment of a wedge element for the head.

FIG. 14 is an embodiment of an applicator that doesn't contact the outer surface of the cover.

FIG. 15 is an embodiment of an applicator that doesn't incorporate a cable passage defined by the separator.

FIG. 16 is an embodiment of an applicator that has a W-channel.

FIGS. 17-18 are front elevation and side elevation views, respectively, that illustrate another embodiment of an applicator with a wedge element.

FIG. 23 is a side elevation view of the applicator of FIG. 22 in section to illustrate the operation of the actuator level.

FIGS. 25A-D are side elevation, side elevation, bottom plan, and rear elevation views, respectively, of the applicator of FIG. 19 illustrating the gate operation.

FIGS. 26A and 26B are section views that illustrate proper and improper application of cover to a cable.

FIG. 27 is a flow diagram of a further method of applying tubular conductor cover to a cable, the conductor cover being split longitudinally to define a first longitudinal edge and a second longitudinal edge.

FIG. 28 is a section view of a double-gate arrangement intended to ensure proper closing of the conductor cover over a cable. For simplicity, the rest of the applicator is not illustrated.

FIG. 32 is a side elevation of the applicator of FIG. 29 with conductor cover being passed through.

FIG. 36 is a perspective view of further applicator applying conductor cover to a cable.

FIG. 37 is a rear elevation view of the applicator of FIG. 29 applying conductor cover to a cable.

DETAILED DESCRIPTION

Immaterial modifications may be made to the embodiments described here without departing from what is covered by the claims.

Tubular conductor covers, such as resilient conductor covers, may be applied to electric cables as a permanent cover to protect against outages caused by weather, trees and animals. Conductor covers typically resist ozone and ultraviolet deterioration, while remaining flexible even at low temperatures. Conductor covers may be made from resilient material, in order to stay firmly wrapped around an energized cable after application. Conductor covers are made from, for example, SALCOR elastomer, silicon rubber tubing, or other polymeric material. Conductor covers are generally dielectrics that act as a barrier to prevent the inadvertent transfer of electrical energy from the cable.

Figure 5:
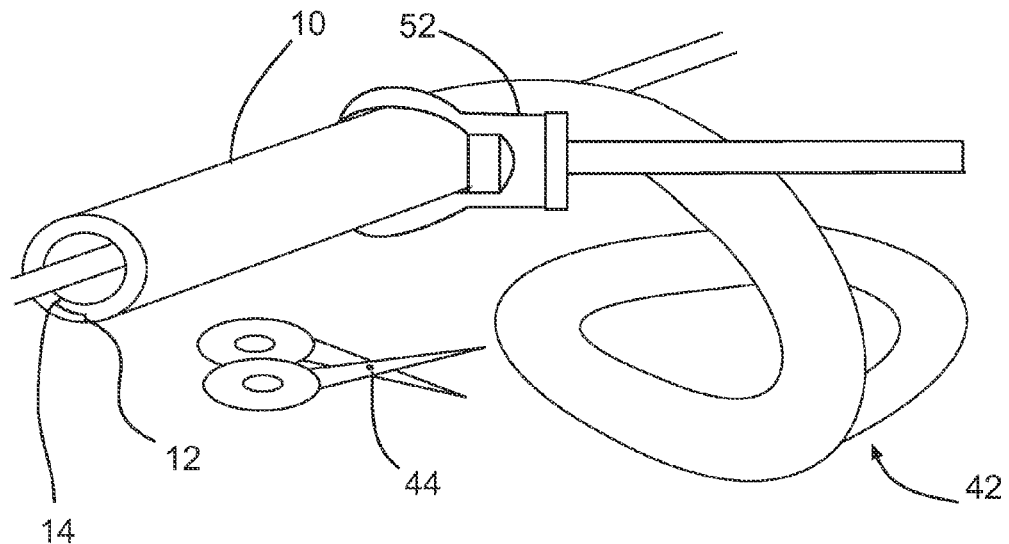
FIG. 5 is a perspective view of conductor cover being cut to length.
Figure 6:
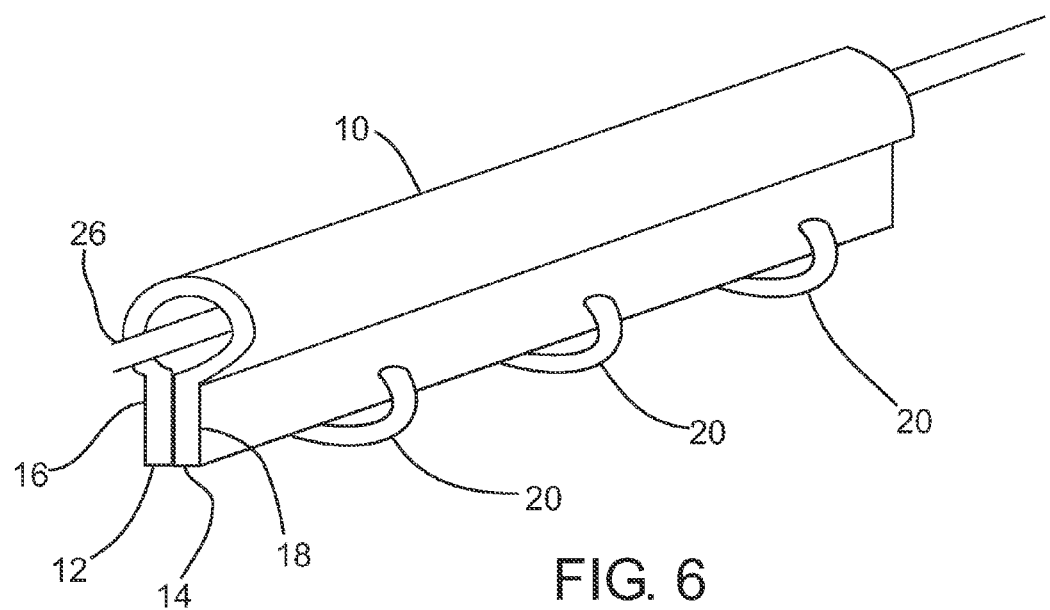
FIG. 6 is a perspective view of installed conductor cover secured with fasteners.

FIGS. 5 and 6 illustrate two different types of conductor cover. Referring to FIG. 5, a cover 10 is illustrated with cover 10 split longitudinally to form an overlapping portion defined by longitudinal ends 12 and 14. This type of cover 10 can typically be installed and secured with zero or very little extra fastening. Referring to FIG. 6, a cover 10 is illustrated that is split longitudinally such that first and second longitudinal ends 12 and 14 define respective flanges 16 and 18 that provide surfaces through which fasteners 20 may be used to secure flanges 16 and 18 together. Another type of cover (not shown), may be a regular tube of material sliced longitudinally and radially down the side such that first and second longitudinal ends 12 and 14 contact one another. Other cover types may be used with the applicators and methods disclosed herein, including heavy and light duty cover. Also, this document should not be limited to conductor cover brands or materials of construction presently on the market. With some types of cover, tape and/or tie wraps may be required as a fastener to secure the cover in place after application.

Figure 1:
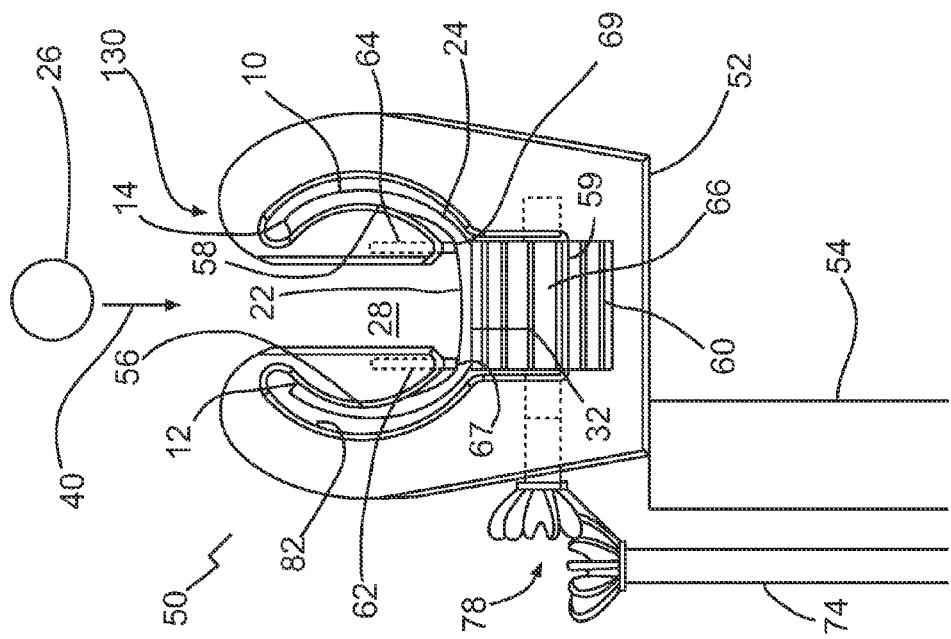
FIG. 1 is a side elevation view, partially in section, of the head of an applicator according to the embodiments disclosed herein.
Figure 4:
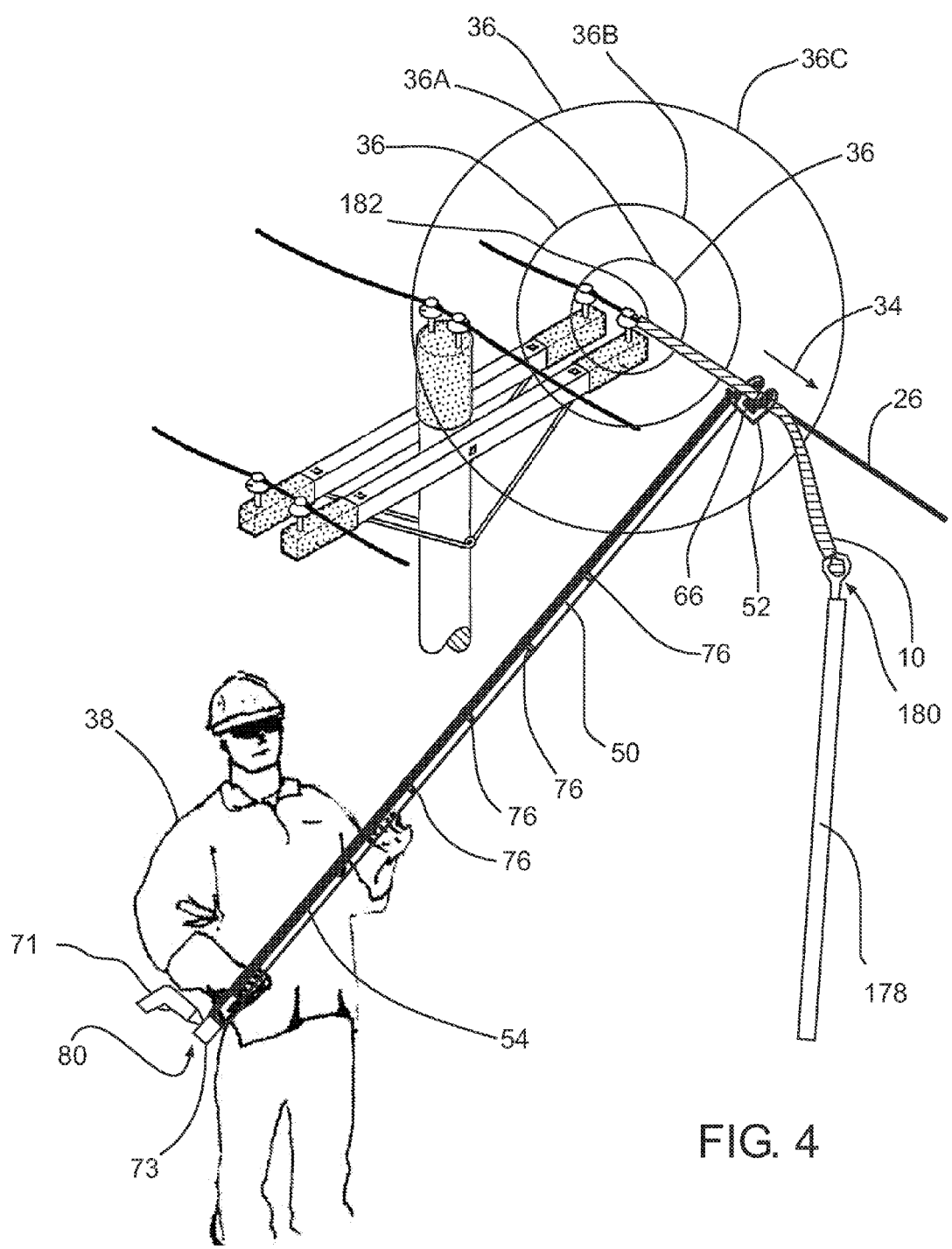
FIG. 4 is a perspective view of an operator installing the conductor cover from outside the limits of approach.

Referring to FIG. 1, an applicator 50 for applying a tubular conductor cover 10, such as a resilient tubular conductor cover, to a cable 26 is illustrated. Referring to FIG. 4, applicator 50 comprises a head 52. The applicator 50 may also comprise a handle 54. Referring to FIG. 1, head 52 has a separator, which may comprise two or more separating elements 56, 58. Elements 56, 58 may be surfaces, of the separator, that may be oriented away from one another. Head 52 may be made out of various materials, for example steel, aluminum, or carbon fiber. Head 52 may be partly or completely constructed of dielectric materials.

Figure 7:
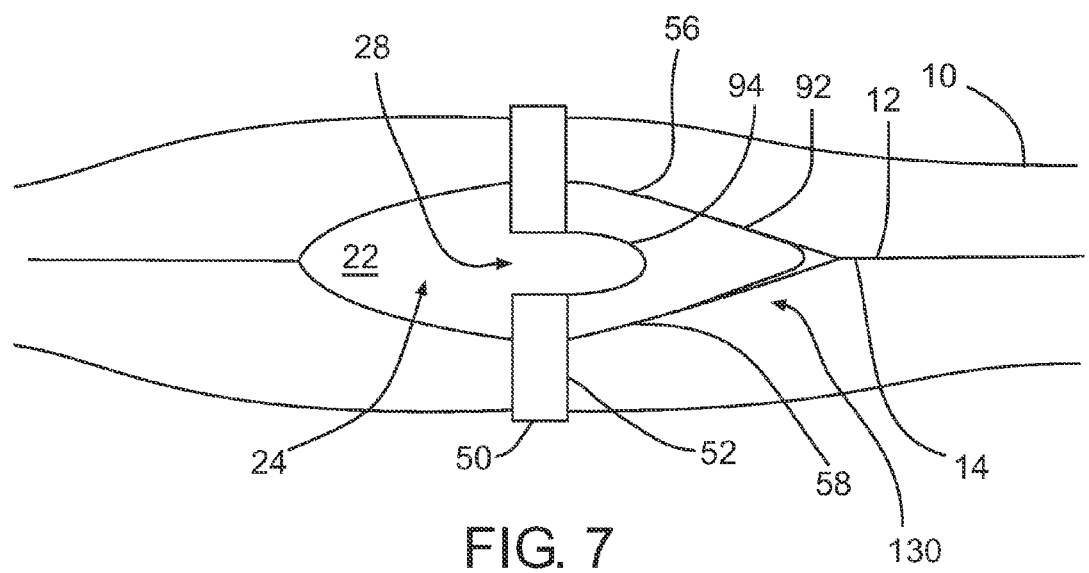
FIG. 7 is a top plan view, in section, of the head of an applicator wedging open a conductor cover.
Figure 13:
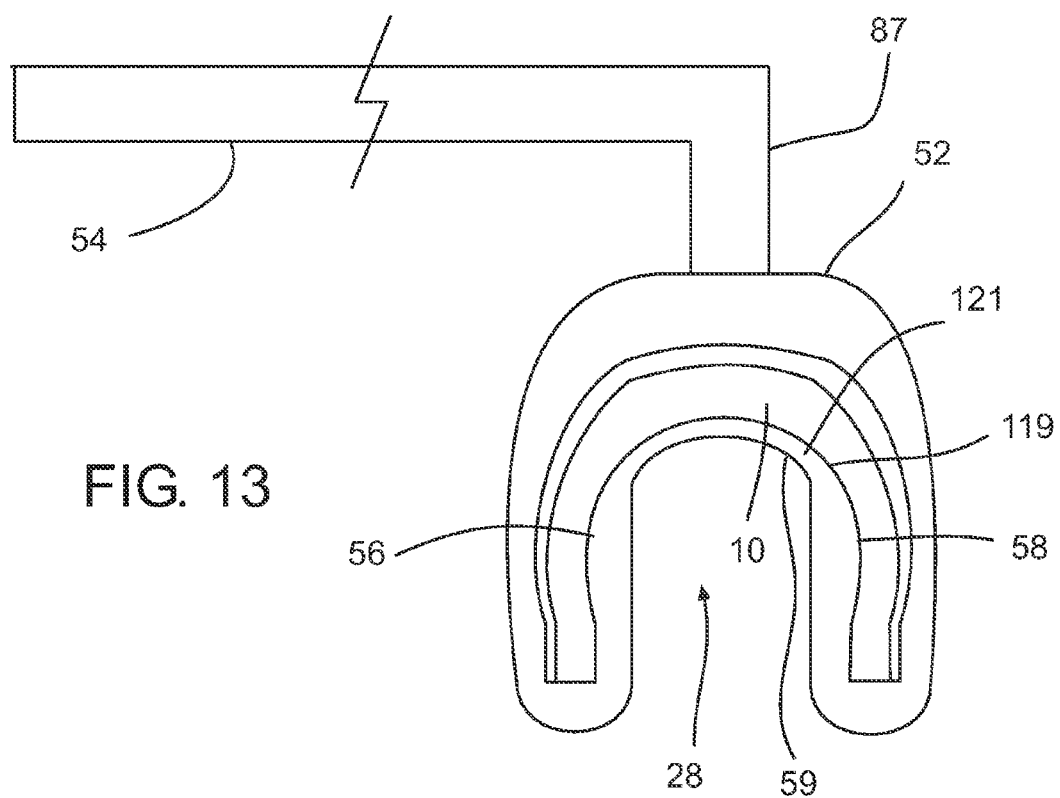
FIG. 13 is a side elevation view of a further embodiment of an applicator with a suspended head.

The separator 130 is shaped to contact an interior surface 22 of the conductor cover 10 to spread open or maintain the first longitudinal edge 12 and the second longitudinal edge 14 along a portion 24 of the conductor cover 10 to allow the portion 24 of the conductor cover 10 to be applied to a cable 26, when the applicator 50 is in operation. In some embodiments such as the one illustrated in FIG. 1, separating elements 56 and 58 may be spaced to contact interior surface 22. In the embodiment illustrated, the separating elements 56, 58 are defined by a pair of inwardly wrapped arms connected to head 52. Referring to FIG. 7, an exemplary portion 24 is illustrated as head 52 of applicator 50 passes along a length of cover 10. Referring to FIG. 1, a cable passage 28 may also be at least partially defined by the separator, for example between the separating elements 56, 58. Referring to FIG. 13, the separating elements 56 and 58 may be integrally connected, for example as shown where separating elements 56 and 58 are formed from a U-shaped separator 59 that also defines cable passage 28. Each separating element may include more than one piece.

Referring to FIG. 1, in some embodiments the head further comprises a roller element having a roller surface for contacting and guiding the conductor cover 10 through the head 52 in operation. An example of such a roller element is roller element 60, which has a roller surface 66 positioned for contacting an exterior surface 32 of the conductor cover 10 to hold the portion 24 of the conductor cover 10 open against the separator, for example against the separating elements 56, 58. The roller element may guide the conductor cover 10 through the head 52. Referring to FIG. 4, as head 52 is moved along the length of cover 10 in a direction 34, roller surface 66 rolls and guides cover 10, facilitating the passage of cover 10 through head 52.

Figure 12:
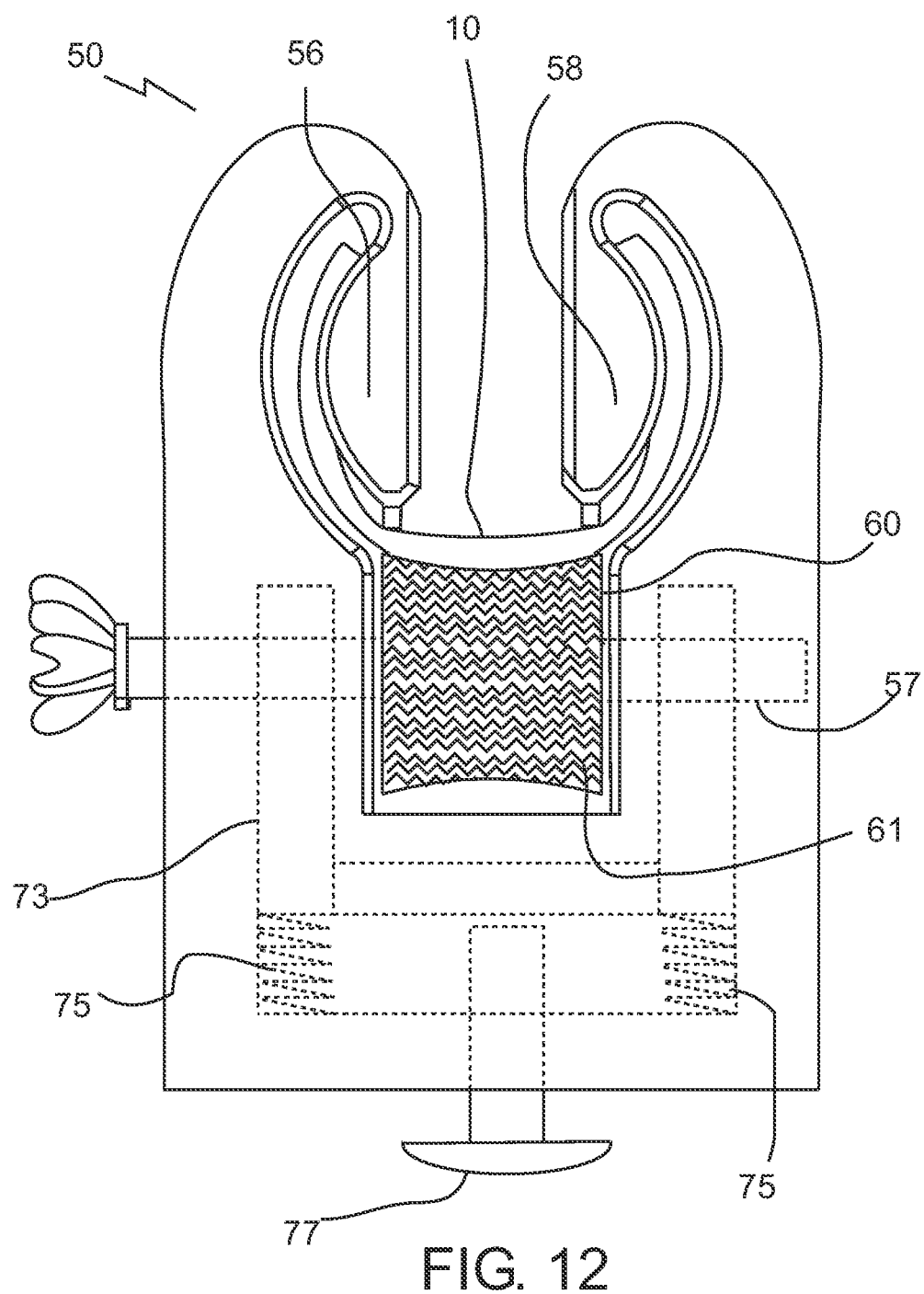
FIG. 12 is a side elevation view, partially in section, that illustrates a mechanism for biasing the roller element into the conductor cover.

Referring to FIGS. 1 and 4, handle 54 may be present for positioning the head 52. The handle 54 may be connected to, or integral with the head 52. In some embodiments, head 52 is pivotally connected to the handle 54. Referring to FIG. 13, head 52 may be suspended from the handle 54, for example by a U or L-bracket 87. Referring to FIG. 1, in some embodiments more than one roller element may be provided to perform the same or a similar function, such as rollers 66 and rollers 62, 64. Thus, roller elements may be mounted on opposite sides of cover 10 for example in opposing orientation to reduce the force required to pass cover 10 through head 52. It should be understood that the roller elements are not limited to standard rollers, and some or all rollers may be driven by gear, track, hydraulic, or chain and sprocket drives, for some examples, or by other drive systems. Referring to FIGS. 1 and 12, in some embodiments the roller surface comprises conductor cover gripping element. For example, the roller surface may grip the conductor cover 10 using ridging 59 (FIG. 1), tread, texturing 61 (FIG. 12), ribbing 160 (FIG. 19), or contouring. The presence of a cover gripping element creates traction and minimizes slippage between the conductor cover and the applicator head as the conductor cover is driven through the applicator head.

Figure 2:
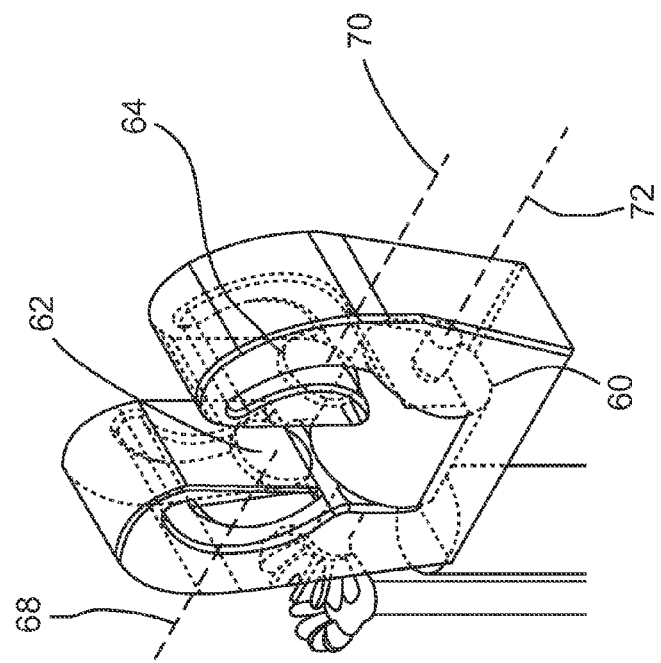
FIG. 2 is a perspective view, partially in section, of the head of FIG. 1.

Referring to FIG. 1, in some embodiments, the roller surface, for example surfaces 67 and 69 of roller elements 62 and 64, may be positioned for contacting the interior surface 22 of the portion 24 of cover 10. A similar effect may be achieved using a single roller element across cable passage 28 instead of roller elements 62 and 64. In some embodiments, roller elements 62 and 64 are contained as part of separating elements 56 and 58, respectively. Referring to FIG. 2, roller elements 62 and 64 may have their respective axes 68, 70 parallel with an axis 72 of roller element 60 in order to further facilitate the passage of cover 10 through head 52, although this is not required. The one or more roller elements may be biased towards the conductor cover 10, for example if the applicator 50 comprises a biasing mechanism such as springs for biasing the roller element toward the cover 10 in use. For further example, at least one of roller elements 62 and 64 may be biased towards the roller element 60 of the head 52. Biasing may be accomplished using an adjustable spring element or a resilient arm, for example. Referring to FIG. 12, an embodiment is illustrated where roller element 60 is biased towards the conductor cover 10. This may be accomplished by mounting an axle 57 of roller element 60 on a bracket 73 biased towards the separating elements 56, 58 by one or more spring elements 75. A screw 77 may be used to limit the distance of the roller 60 from the cover 10. Screw 77 allows the roller tension to be adjusted for a specific type of conductor cover. In general, various tool settings, such as roller tension and spacing of spacer elements to name a few, may need to be adjusted in the field for each type of conductor cover used. Once cover 10 is in head 52, screw 77 may be tightened to apply additional pressure against bracket 73 to tightly secure cover 10 within head 52. Other means may be used to temporarily hold the end of the conductor cover in place while the applicator is being positioned. In other embodiments, one or more of roller elements 60, 62, 64 may be replaced by a respective biasing element (not shown). The biasing element may be for example a resilient arm oriented to bias cover 10 towards, or into contact with, roller element 60.

Figure 19:
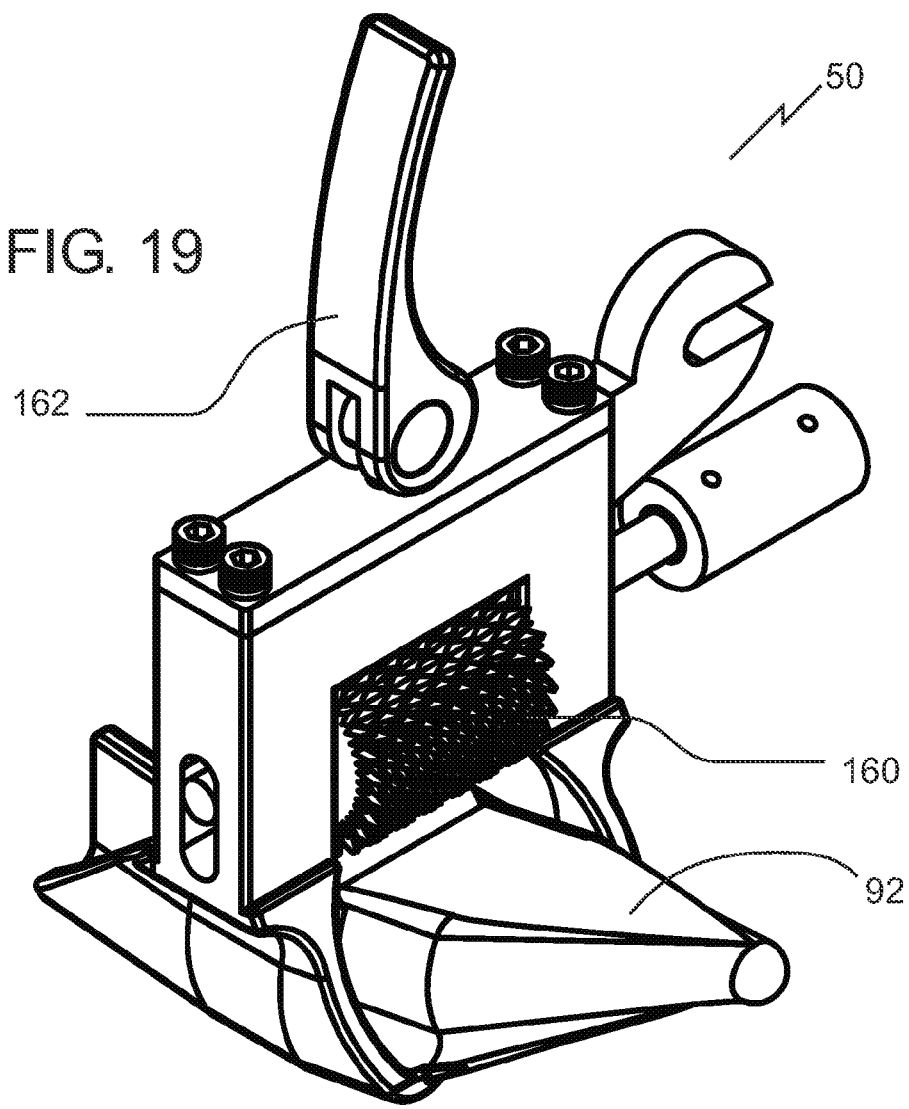
FIGS. 19-21 are perspective, top plan, and side elevation views, respectively, of a further embodiment of a conductor cover applicator.
Figure 20:
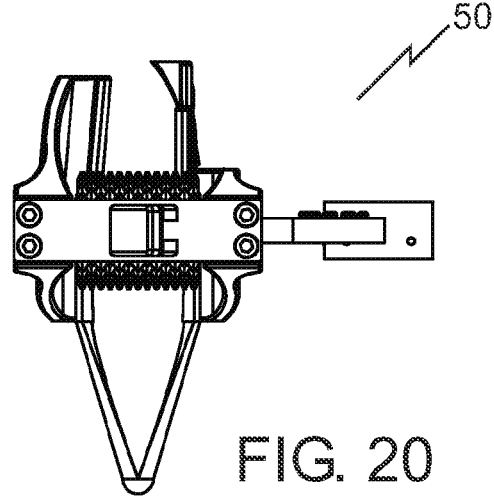
Figure 22:
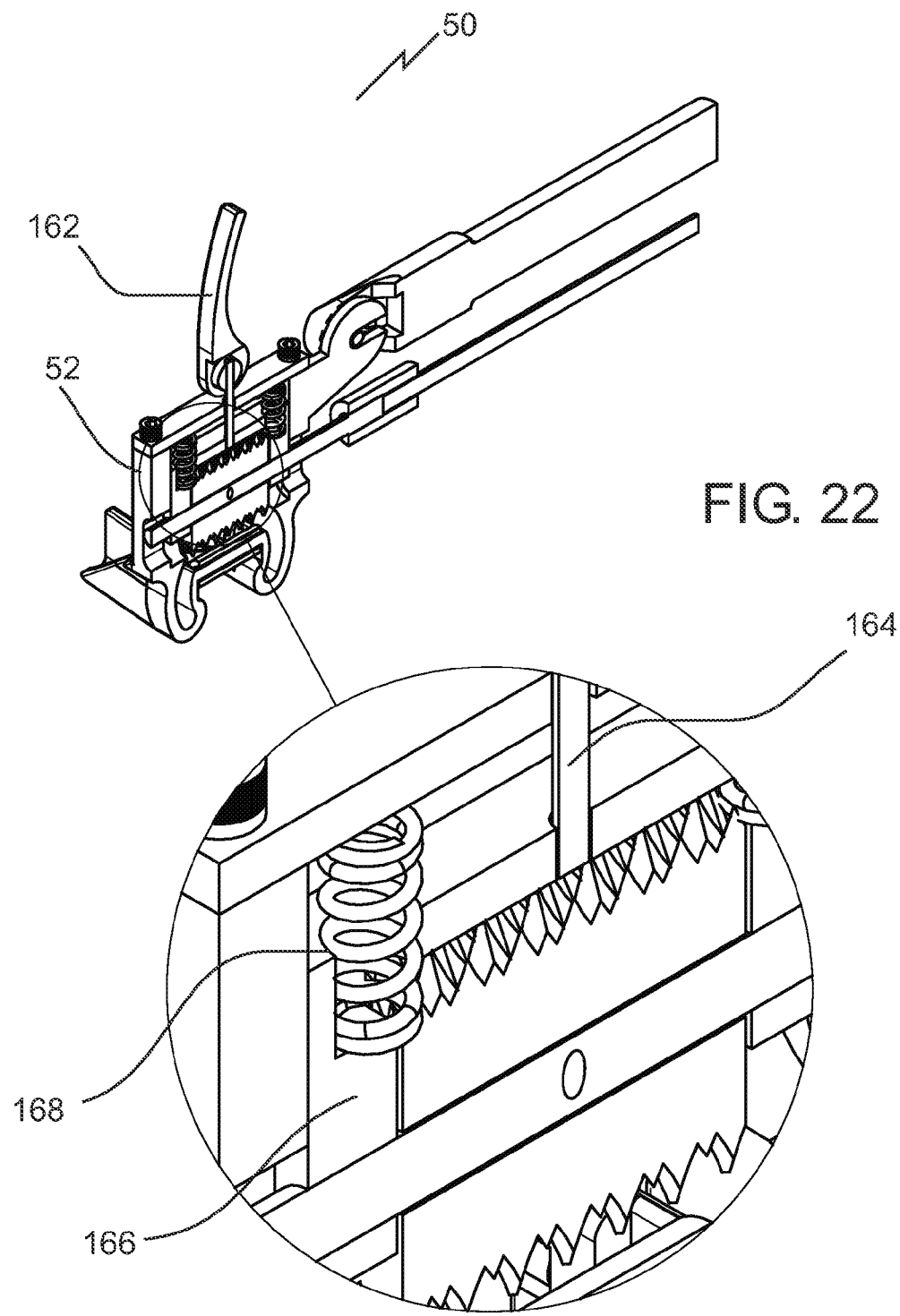
FIG. 22 is a perspective view of the applicator of FIG. 19 with half of the applicator cut-away and part of the view exploded to illustrate the biasing mechanism for the roller element. Also, a hot stick is illustrated as attached to the applicator.

Referring to FIG. 19, applicator 50 may further comprise an actuator lever 162 for advancing and retracting the roller element 60 towards and away from, respectively, the cover 10 (not shown) in use. Referring to FIGS. 22 and 23, lever 162 is a cam-operated lever that retracts and extends a secondary lever 164 into and out of the head 52 as shown. Lever 164 connects to a roller axle frame 166 that is normally biased towards cover 10 in use with springs 168. Referring to FIG. 23, two positions of roller element 60 are illustrated, with the advanced position shown in dotted lines, and the retracted position shown in solid lines. Rotation of actuator lever 162 downwards operates a cam connection to secondary lever 164 to allow secondary lever 164 to be pushed downwards by springs 168. Thus, roller element 60 is advanced into engagement with cover 10 (not shown) in use.

Figure 3:
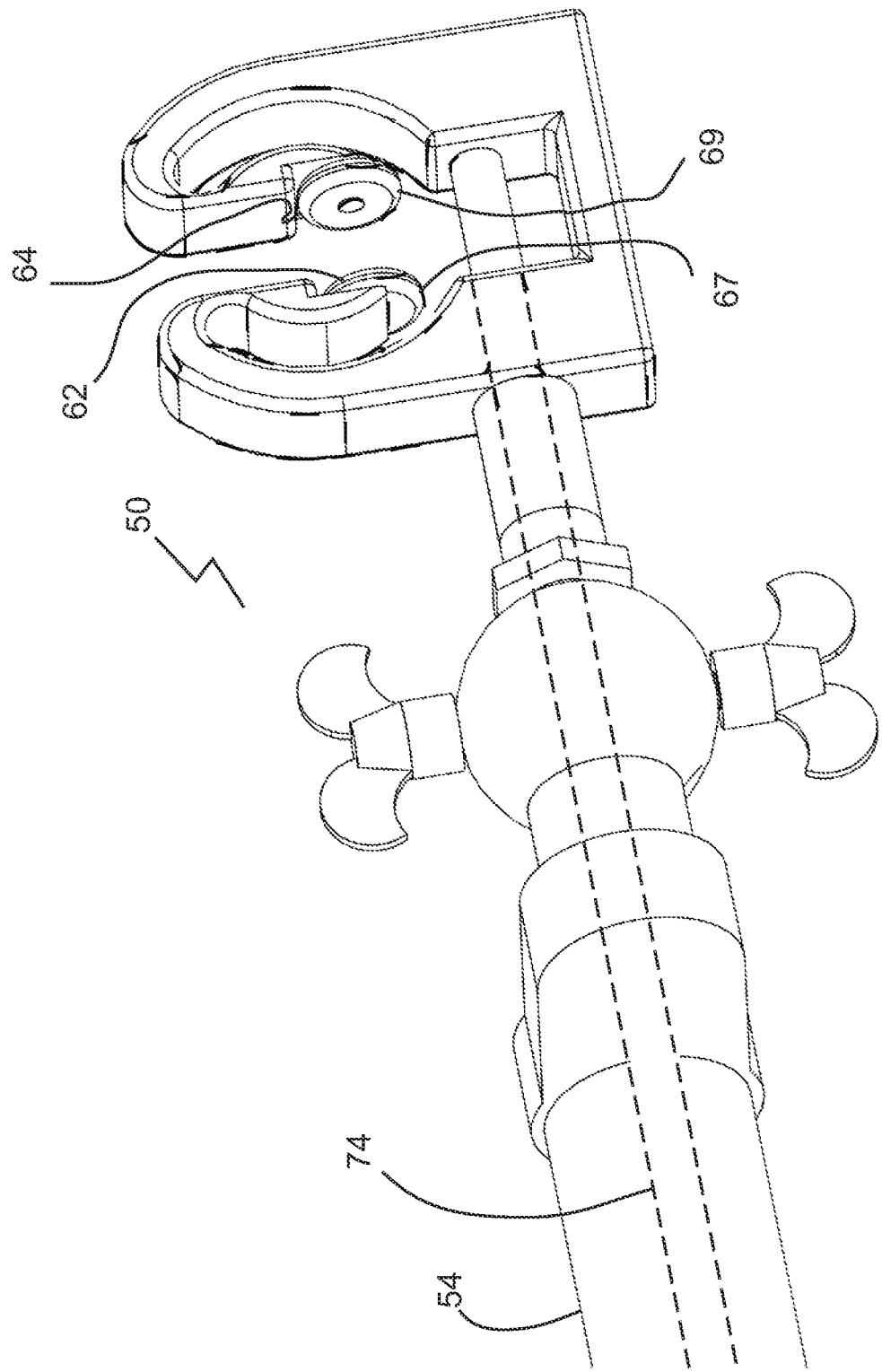
FIG. 3 is a perspective view, partially in section, of the head of another applicator according to the embodiments disclosed herein.
Figures 10A, 10B:
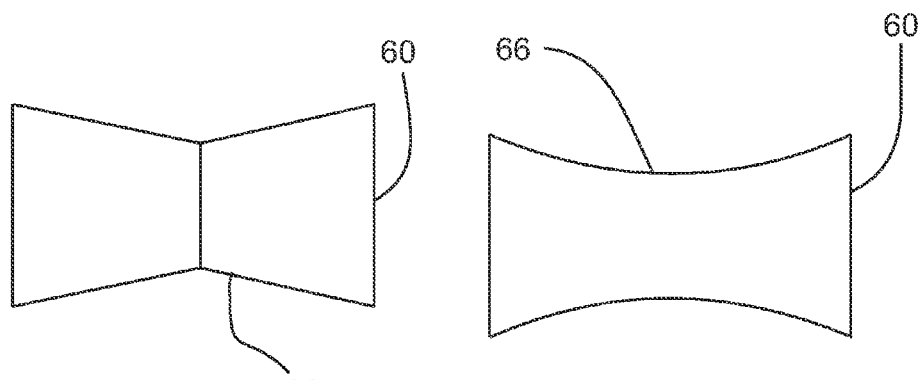
FIGS. 10A-B are side elevation views of different embodiments of a roller element.

Referring to FIG. 10A the roller surface, such as surface 66, may be flat or contoured for example by beveling or shaping surface 66. For further example, the roller surface may be at least partially concave or convex. Referring to FIG. 10B, an example of roller surface 66 is illustrated as concave. Referring to FIG. 3, the roller surfaces 67 and 69 of one or more of rollers 62 and 64, respectively, are illustrated as convex. Contouring the roller surface may allow the roller surface, for example surfaces 67 and 69, to be more closely contoured to fit, in this case the inner surface 22 of, cover 10. Referring to FIG. 1, the roller surface 66 of roller 60 may be at least partially concave. This modifications may allow the roller surface 66 to be more closely contoured to fit and shape to the exterior surface 32 of cover 10 as cover 10 passes through channel 82 of applicator head 52. Referring to FIG. 16, an embodiment is shown with roller elements 111 and 113 having roller surfaces 115 and 117 that are concave and convex, respectively. It should be understood that embodiments exist where one of roller elements 111 and 113 is not present. This embodiment illustrates that a single roller 111 may be used to contact the interior surface 22 instead of dual rollers 62 and 64. Roller elements are understood to include one or more of a belt, pulley, chain and sprocket, gear element, and gear reducing element as examples.

Referring to FIG. 1, the applicator 50 may comprise a drive system for one or more of driving and pulling the conductor cover 10 through the head 52. One or more roller elements may be connected for rotation to the drive system. The drive system may comprise a power source (not shown) such as a motor contained within, near, or at some distance from the head 52. The drive system, which may be at least one drive system, may comprise a drive shaft made at least partially out of dielectric material. In FIG. 1, an exemplary drive shaft 74 for powering roller element 60 is illustrated. In some embodiments, drive shaft 74 is connected to rotate the roller element via a bevel gear connection 78. A bevel gear assembly may be advantageous in situations where head 52 is pivotally connected to the handle 54. Other gear arrangements are possible. In some embodiments, the gear connection may involve gear reduction. The drive system may comprise a hydraulic drive system that acts directly on the applicator head, in some cases eliminating the need for a drive shaft. FIG. 1 illustrates an embodiment of applicator 50 where drive shaft 74 is contained at least partly outside of and along the handle 54, for example parallel to handle 54. Referring to FIG. 4, the drive shaft may be held close to handle 54 along its length by a series of alignment brackets 76. Referring to FIG. 3, an embodiment is illustrated where drive shaft 74 is contained at least partly within the handle 54 of applicator 50. Referring to FIG. 4, in some embodiments as discussed above, the drive system may incorporate a power source, for example if drive shaft 74 is connected to a power source located at a user end 80 of handle 54. A suitable power source may comprise one or more of a battery, a hydraulic power supply, a power drill 71, and a human being 38. Drive shaft 74 may be connected to be rotated using a rotatable handle, or through an attachment 73 for a powered drill 71 as shown. In some embodiments, the operation of the drive source may be controlled at head 52. In some embodiments, the power source, for example, a hydraulic motor, may be located at or near the applicator head, eliminating in some cases the need for a drive shaft and accompanying drive transmission mechanism. It should be understood that any suitable mechanism for transferring the rotational torque from a power source (not shown) to any of the one or more roller elements may be used. The drive system may incorporate for example one or more of the roller element, a ratchet handle, and a pump. In use, the drive system may be located one or more of ahead of, as part of, and behind, the head 52. The drive system may comprise a drive unit that attaches to the conductor cover apart from the head, in order to pull or push the conductor cover through the head. In this way, the drive system may be separate and distinct from the head, and may directly grip, for example by one or more of surrounding and enclosing, the conductor cover at some point distant from the applicator head to drive the conductor cover. An example of this (not shown) may be a roller system connected to the head 52, for example by a chain, the roller system in use gripping the conductor cover and progressing up the length of the conductor cover to draw the cover through the head 52.

Figure 8:
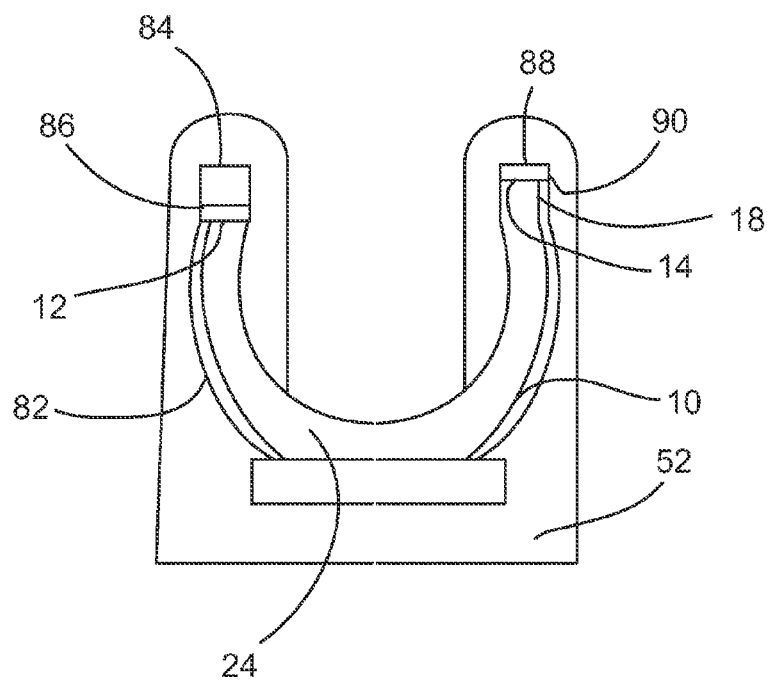
FIG. 8 is a side elevation view, in section, illustrating the use of adjustable spacers.

Referring to FIG. 1, the head 52 and separator 130, for example separating elements 56, 58, may define a channel 82, for example a U-channel, contoured to fit the portion 24 of the conductor cover 10. Channel 82 allows a lateral cross-section of the portion of the conductor cover to be held open by applicator 50, so that a suitable length of conductor cover may be fed through the head 52. Channel 82 may be a flat slot in some cases, like a mail slot in a door for example. Referring to FIG. 16, channel 82 may be other suitable shapes, such as a W-channel. Channel 82 may be shaped to correspond with the shape of the portion 24 of cover 10 as portion 24 opens into engagement with head 52. Referring to FIG. 8, some part of the channel 82, for example an end 84, may comprise a spacer element 86. One or more spacer elements may be used to adjust the size and shape of the channel 82 to correspond with the particular cover size being used. For example, one or more of the length and width of the channel 82 may be adjusted using spacers. For example, spacer element 86 is used for fitting up adjacent the first longitudinal edge 12 when in use, to modify the length of the channel 82. FIG. 8 also shows an embodiment where a second end 88 of the channel 82 comprises a spacer element 90 for fitting up adjacent the second longitudinal edge 14, or for otherwise modifying the length of the channel 82 when in use. Spacer elements allow the length of channel 82 to be tailored to fit different sizes of covers 10. Spacer elements also may be used to prevent off-centre lateral migration of cover 10 within the head 52. FIG. 8 illustrates a head 52 with adjustable spacer elements 86 and 88. Depending on the size of the conductor cover and how the conductor cover was inserted into the channel 82, the spacer elements may be adjusted for a more secure fit of cover 10 in channel 82. Spacer element 86 is illustrated here as positioned further down the channel 82 on the left than spacer element 90 is positioned on the right, although this is not required and may be reversed. Spacers used may be inserts that can be snapped into place, or they may be adjustable, for example adjustable pieces or spring-loaded elements. Referring to FIG. 8, spacer elements 86 and 90 may be adjustable pieces fitted on a track within channel 82 for example. Once in position, the spacer elements may be locked in place. The use of spacer elements allows the head 52 to fit a variety of sizes of conductor covers 10.

The channel 82 of FIG. 1 may be contoured to fit the type of cover 10 illustrated in FIG. 5, whereas the channel 82 of FIG. 8 may be contoured to fit the type of cover 10 illustrated in FIG. 6. In other embodiments, channel 82 may be contoured to fit plural types of covers 10.

Referring to FIG. 1, in some embodiments with handle 54, the handle 54 comprises a hot stick made at least partially of a dielectric material, for example if handle 54 comprises a dielectric shaft. For energized application the handle may comprise a rated dielectric material that has passed an industry standard test. In some embodiments, the entire handle 54 is a dielectric shaft. Referring to FIG. 4 a hot stick may be used for applying conductor cover 10 to energized cable 26 from outside of the limits of approach 36. A hotstick allows a user 38 to apply cover 10 from a position outside the safe limits of approach 36. Standard limits of approach are generally set by the IEEE for live electrical systems. It should be understood that the limits of approach may vary according to region. The limits of approach 36 around energized equipment generally widens as the voltage increases. In the illustration of FIG. 4, the limits of approach 36 correspond to increasing voltages, and thus increasing radii, from limits of approach 36a-36c. The hotstick may be provided in a length or lengths that are suitable for the various limits of approach standards in all jurisdictions.

Figure 21:
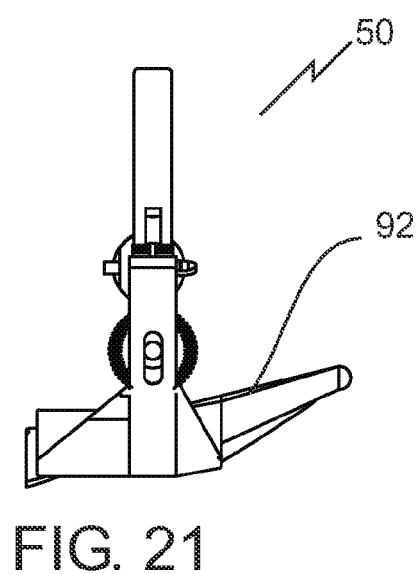
Figure 24B:
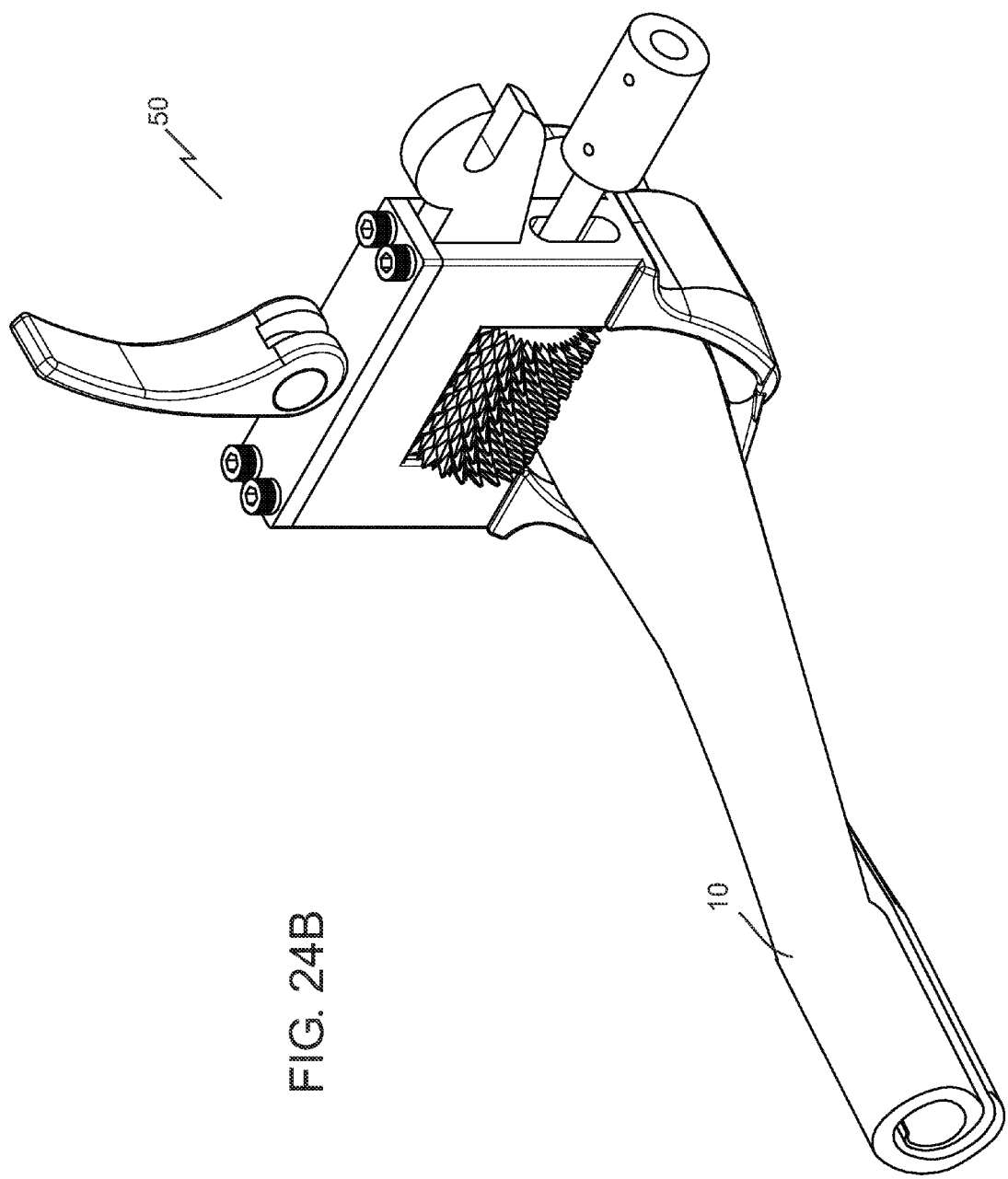
FIGS. 24A and B are perspective views that illustrate the operation of the wedge element of the applicator of FIG. 19.
Figure 29:
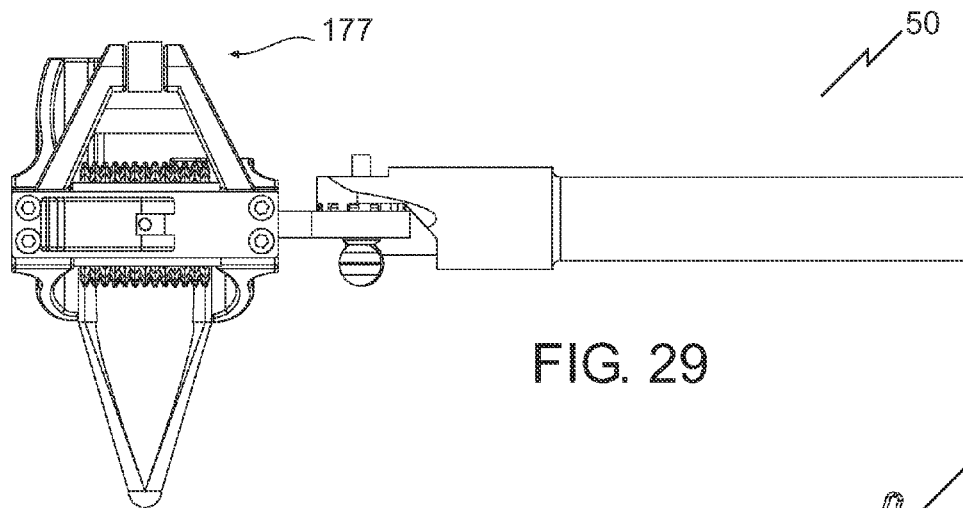
FIG. 29 is a top plan view of a further applicator.
Figure 30:
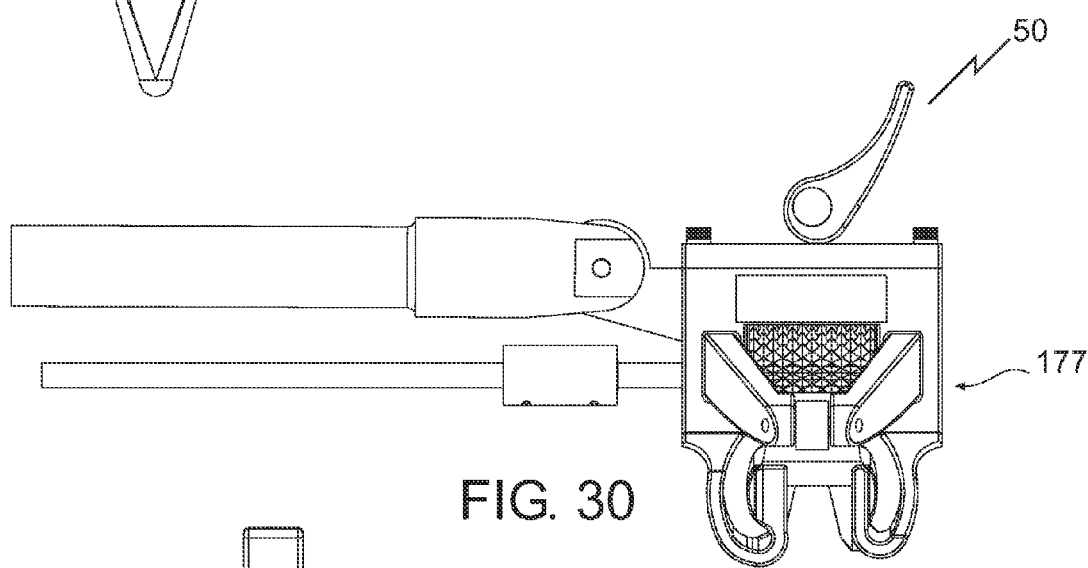
FIG. 30 is a rear elevation view of the applicator of FIG. 29.

Referring to FIG. 7, the separator 130, for example two or more of the separating elements 56, 58, may converge inwardly to define a wedge element 92 for spreading the first longitudinal edge 12 and the second longitudinal edge 14 apart during axial movement of the conductor cover 10 through the head 52. Wedge element 92 may guide first longitudinal edge 12 and second longitudinal edge 14 into the open position as shown. Referring to FIGS. 7 and 11C, wedge element 92 may have a groove 94 for defining cable passage 28. Referring to FIG. 11A, an embodiment of a wedge element 92 comprising a wire rack 93 is illustrated connected to head 52. The wire rack 93 may comprise one or more guide arms 95A, 95B, and 95C arranged to guide the conductor cover (not shown) into the head 52. Referring to FIGS. 11A and B, the orientation of wire rack 93 on head 52 may be reversible. An example of this is illustrated by installing installation ends 99 of wire rack 93 on alternate sides of head 52 through holes 101 that pass through head 52. The wedge element 92 may define one or more of the separating elements. Referring to FIG. 19, another embodiment of a wedge element 92 is illustrated. Referring to FIGS. 24A-B, cover 10 is illustrated as being spread open and loaded into applicator 50 for application to a cable 26 (not shown). Referring to FIG. 21, wedge element 92 may be angled upwards as shown. Thus, cover 10 may be bent at the point of roller contact in order to increase the surface area of cover 10 that is contacted by the roller. Angling of the cover 10 with respect to the cable 26 is discussed further below.

Figure 9:
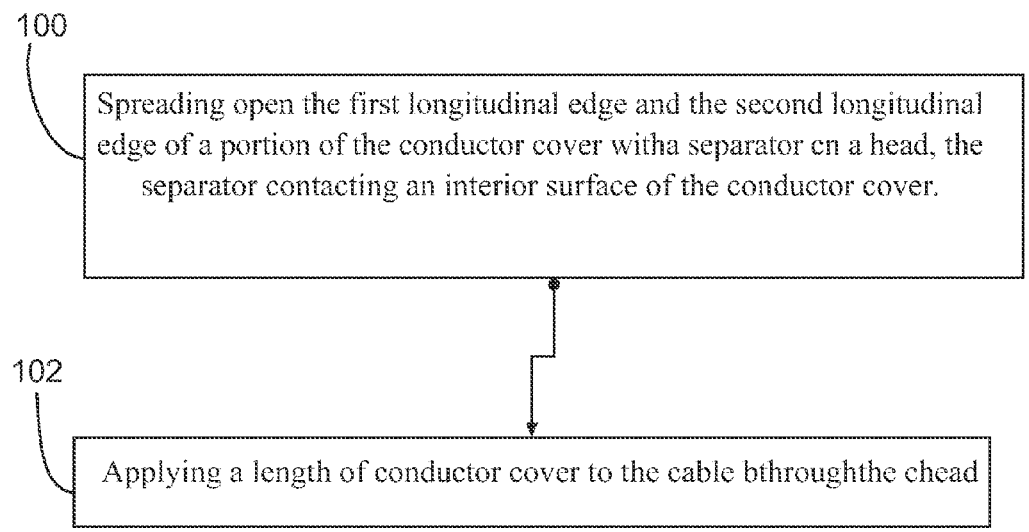
FIG. 9 is a flow diagram of a method of installing tubular conductor cover over a cable.

Referring to FIG. 9, a method of installing tubular conductor cover over a cable is illustrated. Referring to FIG. 1, in stage 100 (shown in FIG. 9) the first longitudinal edge 12 and the second longitudinal edge 14 of portion 24 of the conductor cover 10 are spread open with a separator, for example a pair of separating elements 56, 58 of the separator. The separator, for example separating elements 56, 58, may contact interior surface 22 of the conductor cover 10. As shown, roller surface 66 of the roller element 60 may contact outer surface 32 of the conductor cover 10 to hold the portion 24 of the conductor cover 10 against the separating elements 56, 58 and/or to assist in driving the conductor cover through the applicator head. As illustrated in FIG. 1, head 52 may be positioned over a cable 26, for example using handle 54, which further may be connected to head 52, to ensure that the cable 26 is located sufficiently adjacent to the interior surface 22 of the portion 24 of cover 10. In this fashion, cable 26 is indirectly positioned or inserted for example through cable passage 28. This positioning is illustrated using arrow 40 to indicate the relative path of movement for cable 26 into cable passage 28. It should be understood that the head may be positioned by relative movement between the cable 26 and applicator 50, for example movement of the applicator 50 over a stationary cable 26. In some cases the cable 26 may be moved. Referring to FIG. 4, in stage 102 (shown in FIG. 9) a length of conductor cover 10 is applied to the cable 26 through the head 52, for example by guiding the head 52 along the cable 26 using the handle 54. Through the head may mean across the head in some cases. This movement is illustrated by arrow 34. The cover 10 may be clamped against the separator prior to application, for example clamped between opposing roller elements as shown in FIG. 12. Applying may further comprise rolling the conductor cover 10 through the head 52 using the one or more roller elements, for example roller elements of the head 52 in contact with the conductor cover 10. Applying may comprise one or more of driving and pulling the conductor cover 10 through the head 52. Referring to FIG. 5, the length of conductor cover 10 desired may be supplied from a conductor cover supply 42. The conductor cover 10 may be cut to the desired length before, after, or during the application of the length of conductor cover 10. Cover 10 may be cut to length using utility snips 44 for example. Referring to FIG. 6, the conductor cover 10 may be secured to the cable 26 using fasteners 20, for example after a length of cover 10 is applied. Referring to FIG. 4, in some embodiments with the head 52 being connected to a handle 54 that comprises a hot stick made at least partially of a dielectric material, the conductor cover 10 may be applied to an energized cable 26 by a user 38 outside the limits of approach 36. The handle may be guided in an axial direction relative to the cover 10. Applying may comprise guiding head 52 along the cable as shown.

Referring to FIG. 13, separating elements 56, 58 may simply be surfaces on head 52, for example opposed surfaces. In some embodiments plural heads 52 in series may be used to apply the cover 10. Referring to FIGS. 13 and 1, the separator may contact the interior surface of the cover 10 in a contiguous or non-contiguous fashion, respectively, as shown. Referring to FIG. 13, a surface 119 of the separator 121 may be contiguous between the separating elements 56, and 58, so that the separating elements 56 and 58 are merely defined at different locations along the surface 119 according to the shape of the separator 121.

Referring to FIG. 15, an embodiment of applicator 50 is illustrated that doesn't define a cable passage between separating elements. A roller element (not shown) may contact interior surface 22 of cover 10 to facilitate the passage of head 52 through cover 10. A cable 26 is illustrated as being inserted into cover 10.

Referring to FIG. 14, an embodiment of applicator 50 is illustrated that doesn't wrap around the exterior surface 32 of cover 10. In this and other embodiments, the edges 12 and 14 of cover 10 may hook onto the separator 130, which acts as a separating element, to prevent the cover 10 from popping off of the head 52. This may be achieved for example by providing one or more indents 55 in head 52, or by sizing the separator small enough to allow one or more of edges 12 and 14 to hook over one or more ends 57 of the separator. A drive system may be employed to drive the cable 26 into the cover 10. A suitable drive system may employ one or more roller elements 51 and 53. Ghost lines are used to indicate the optional positions of roller elements 51 and 53. The drive system may be adapted to remotely connect to the cable 26 by suitable means. For example, drive roller 53 may snap into place over cable 26 when cable 26 is in position in head 52. Other drive systems may be used.

In some embodiments of the applicator 50 disclosed herein, application may be improved by securing or holding one end of cover 10 to the cable 26 before the head 52 is used to apply the cover 10. Securing or holding may be achieved using a hotstick for example, or by other methods.

Embodiments of the apparatuses and methods disclosed herein may provide the advantages of the hotstick work method disclosed in the background information section, albeit in an improved manner. In some embodiments, the applicator 50 may be a handheld device. Such a device may not require a hotstick handle. In further embodiments, such an applicator 50 may have for example a hand-grip (not shown) on the head. In other embodiments, a handle may be used. It should be understood that the methods disclosed herein may be used with any of the embodiments of applicators disclosed herein.

FIGS. 17-18 illustrate another embodiment of an applicator 50, with no roller elements. In this embodiment, the separator includes wedge element 92 configured to separate the longitudinal ends of the cover 10 (shown in FIG. 17 only). Also, a backing 150, such as a bearing surface as shown, may be configured to maintain the cover against the separator.

FIG. 11B includes an axis 152 about which the head 52 may hinge. A hinge axis such as 152 may be positioned elsewhere on the applicator 50. In order for hinging to occur, the head may be split into two of more parts 52A and 52B, although this is not explicitly shown in FIG. 11B. The parts may be joined by a hinge or other joining mechanism. Axis 152 through the head 52 is drawn as an example of a location for a hinge (not shown) between parts 52A and 52B.

Referring to FIGS. 25A-25D, an applicator 50 is illustrated with a gate 170. Gate 170, which may be hinged, has an at least partially closed position, such as the closed position shown in FIGS. 25B, C, D, and is shaped to guide, when in the at least partially closed position, the first longitudinal edge 12 at least partially across the cable passage 28 and under the second longitudinal edge 14 as the cover 10 exits the applicator 50 (FIG. 25C and FIG. 36). The gate 170 may be movable across a range of positions from open to closed, within which range the at least partially closed position may be located. The gate 170 may be comprised at least in part of flexible material, for example if the gate 170 has a living hinge (not shown) or if the gate 170 is a flexible flap (not shown). In other embodiments the gate 170 may guide edge 12 over edge 14. As shown in FIG. 25C, gate 170 may hold the more tightly curled edge of the two edges 12 and 14, for example edge 12 of the conductor cover 10 shown, open longer so edge 12 will not undesirably curl up against itself as shown in FIG. 26A. Thus, gate 10 may form part of a larger exit separator 191 (FIG. 36) shaped to converge about cable 26 much like wedge element 92 in order to ensure proper closure of cover 10 about cable 26. In general, the separator 130 (FIG. 36) may converge inwardly at a cover exit end 176 of the head 52 for closing the first longitudinal edge 12 and the second longitudinal edge 14 together about the cable 26 during axial movement of the conductor cover 10 through the head 52. The portion of separator 130 that converges inwardly at cover exit end 176 may be considered to be an exit separator 191 that is distinct from the rest of separator 130. As shown in FIG. 36, the separator 130 may be comprised of multiple parts, for example exit separator 191 and an inlet separator such as wedge element 92. The gate 170 may at least partially close the cable passage 28 (see transition from FIGS. 25A-25B, and FIG. 25C). Gate 170 may not close passage 28 entirely, for example in order to allow cable 26 to be removed if necessary during closure. At least when open (FIG. 25A), gate 170 allows sufficient clearance for cable 26 to fit within passage 28. Referring to FIGS. 25A-B, the gate 170 may be biased to close in the presence of cover 10, for example when cover 10 passes through head 52 upon exiting the separator, as shown. Gate 170 is illustrated as being hinged along axis 172, so that as cover exits head 52, the cover 10 contacts the gate 170 and pushes gate 170 closed or partially closed over passage 28. Gate 170 may also be biased closed by indirect contact, such as through intermediate components (not shown).

Referring to FIGS. 25A and D and FIG. 36, gate 170 may comprise one or more cover edge guide ridges 174. Ridges 174 may be provided for restricting the first longitudinal edge 12 from curling back on itself. Ridges 174 stand out from the exterior surface of the gate 170 and are adapted to direct the movement of longitudinal edges of the cover 10 radially under or over one another as the cover begins to close over the cable 26 (shown in FIG. 25C). Referring to FIG. 25C, which illustrates in dotted lines portions of ridges 174 that are covered in the figure by cover 10, one or more of the cover edge guide ridges 174 may be angled across the cable passage 28 with increasing distance across the cable passage 28 towards an exit end 173 of the gate 170. Referring to FIG. 25D, ridges 174 may be defined by a sloped entry surface 181 in order to guide edge 12 up and over ridge 174 and to prevent edge 12 from contacting ridge 174 and curling back in on itself.

As shown, gate 170 guides the first longitudinal edge 12 toward the second longitudinal edge 14 as the cover 10 exits the applicator 50 in use. Referring to FIG. 26B, guiding at least one of edges 12 and 14 in this fashion promotes proper closing of cover 10 as shown. Thus, avoided is the situation of improper closing shown in FIG. 26A where edge 12 curls inwards back on itself to leave a portion of cable 26 exposed. If the situation shown in FIG. 26A occurs, a universal tie stick or other type of hook (not shown) may be run longitudinally through the conductor cover 10 after application to unhook the curled edge 12 and ensure proper closure.

Although FIGS. 25A-D illustrate an applicator 50 with a single gate 170 for one of edges 12 or 14, one or more gates 170 may be provided. Referring to FIG. 28 for example, a second trailing gate 170B may be hingedly connected to the applicator 50 (not shown) for guiding edge 14 over edge 12. The first gate 170A and the second gate 170B may overlap when in the respective at least partially closed positions as shown. One or more of gates 170A and B may be adjustable in position, for example to reverse the overlap so that edge 12 curls over edge 14.

Figure 31:
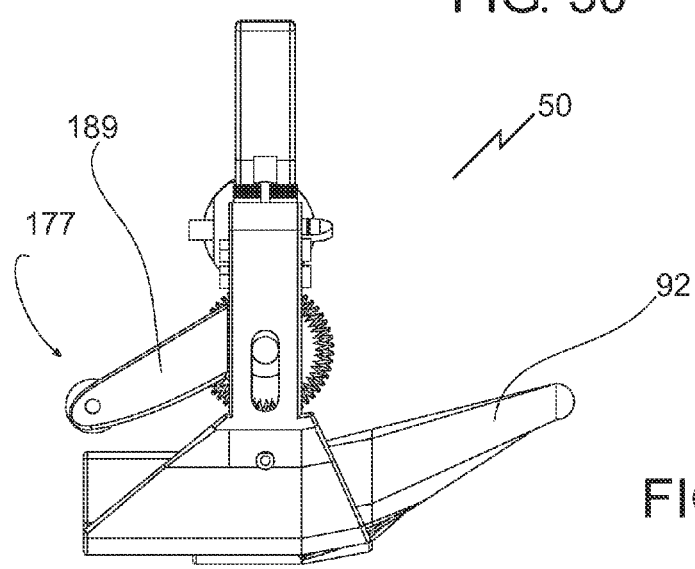
FIG. 31 is a side elevation of the applicator of FIG. 29.
Figure 32:
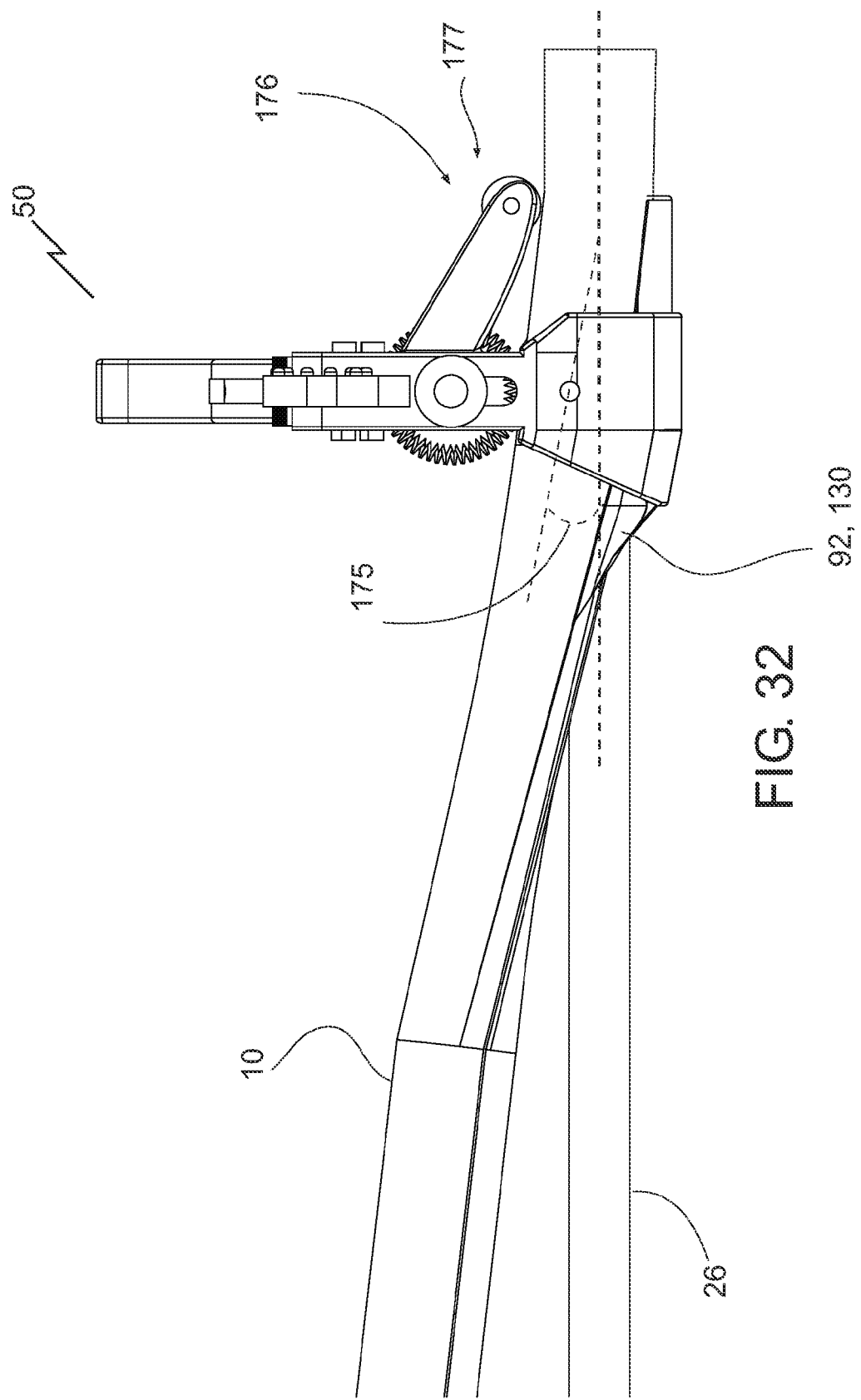
Figure 33:
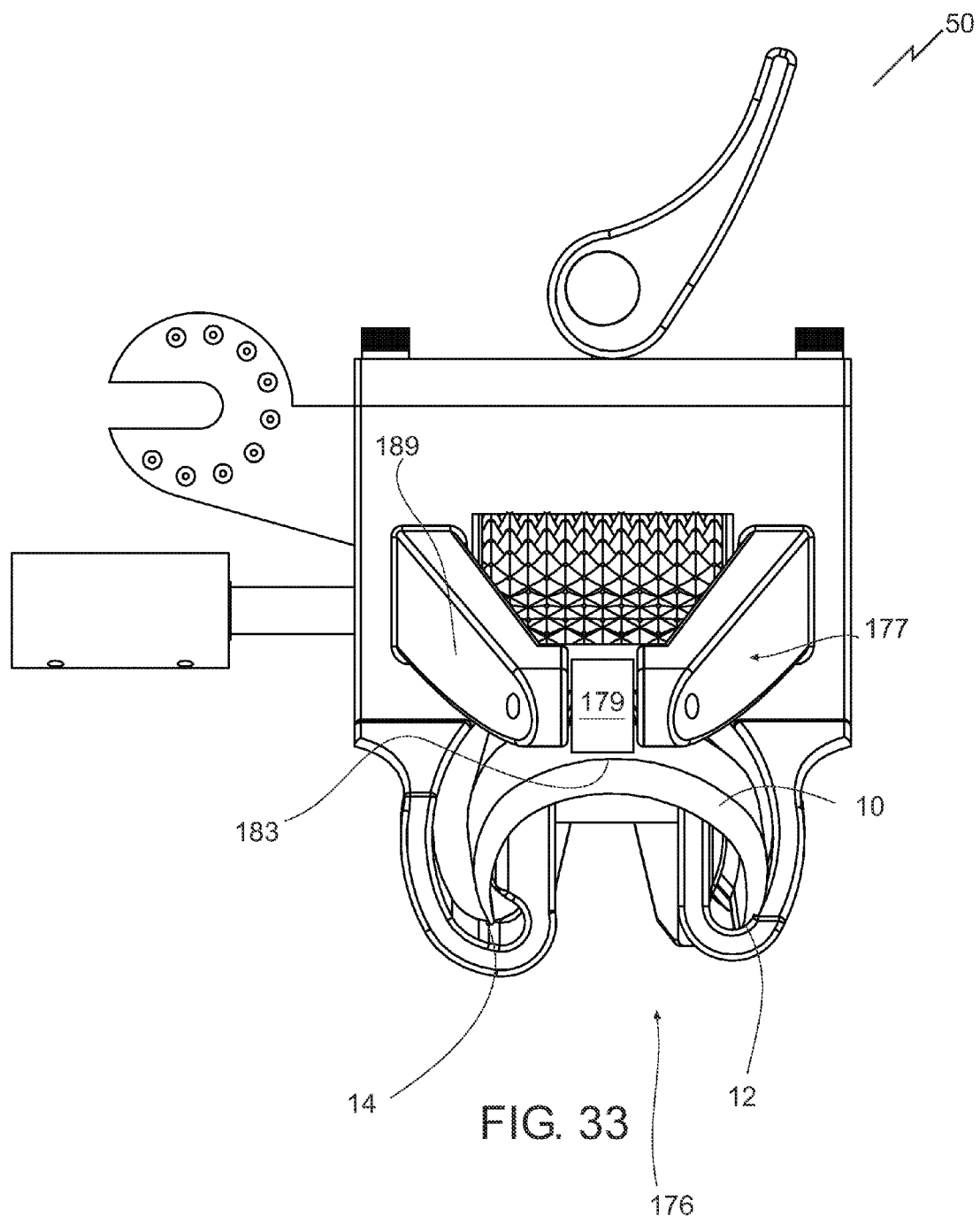
FIG. 33 is a rear elevation view of the applicator of FIG. 29 with conductor cover positioned within the head.
Figure 34:
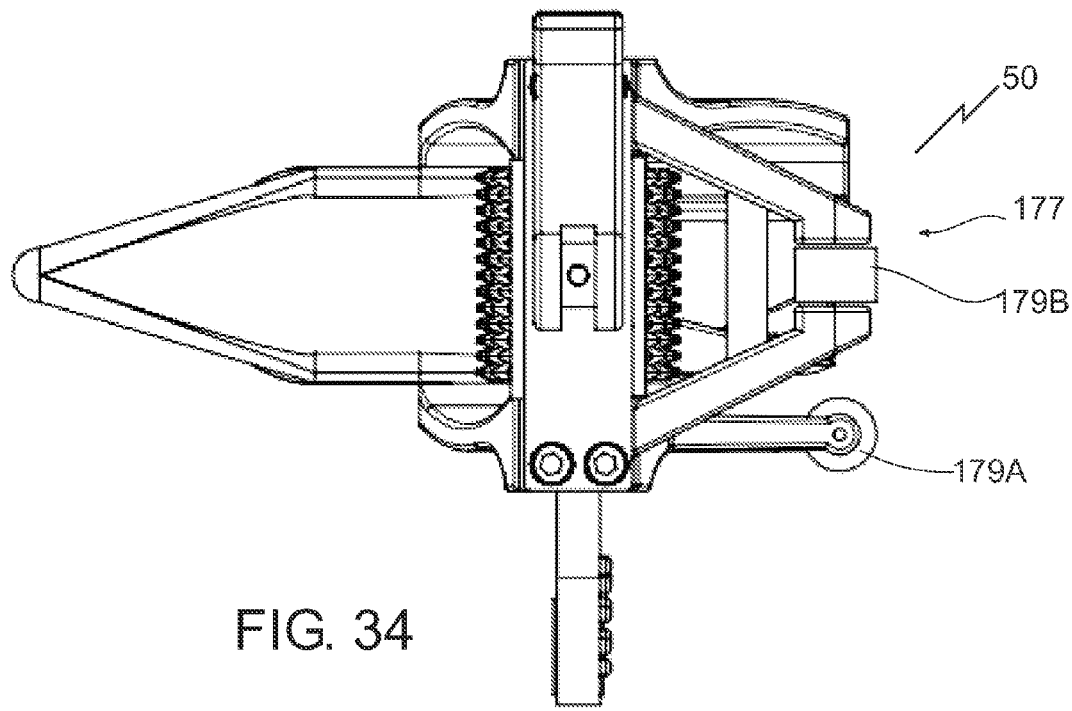
FIG. 34 is a top plan view of a further applicator.
Figure 35:
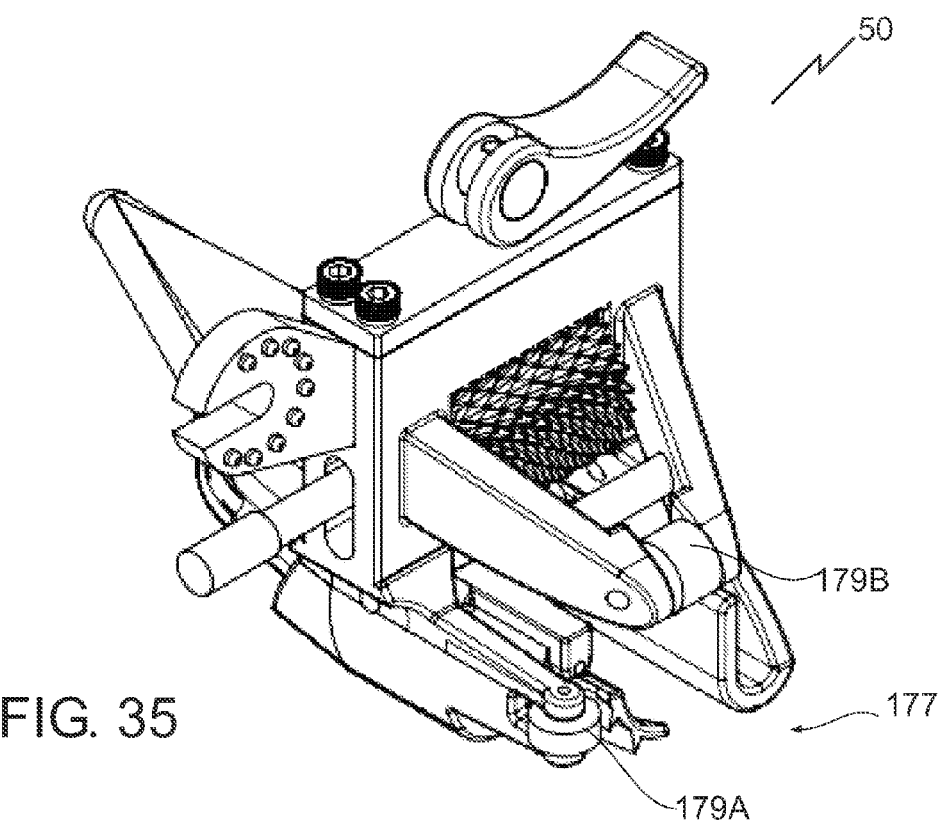
FIG. 35 is a perspective view of the applicator of FIG. 34.

Referring to FIGS. 29-33, a further applicator 50 is illustrated with a cover exit guide 177. Cover exit guide 177 is positioned at a cover exit end 176 (FIGS. 32 and 33) of applicator 50 and is provided for in use pressing the conductor cover 10 towards the cable 26 upon exit from the applicator 50. Referring to FIG. 33, guide 177 may comprise a roller element 179 such as a roller as shown, and may contact cover 10 at an intermediate portion 183 between edges 12 and 14. Roller element 179 may be held in place by a rearwardly extending frame 189 (FIGS. 31 and 33). Referring to FIG. 32, separator 130 and guide 177 may be arranged relative to each other to ensure that cover 10 is applied to cable 26 at a desired application angle 175 with respect to cable 26. For example, wedge element 92 (FIGS. 31 and 32) may be directed to accept entry of cover 10 at an angle, such as an acute angle, relative to cover exiting the applicator 50 at end 176. Referring to FIG. 33, guide 177 may also laterally align edges 12 and 14 of cover 10 within the applicator 50, for example by partially flattening the cover 10 on exit. Angling the entry and exit of cover 10 is advantageous because it has been found to be more efficient to apply conductor cover 10 at an angle relative to the cable. In addition, angling reduces the effective longitudinal length of the applicator 50 that is required to be positioned over the cable 26 and also allows the applicator 50 to be further tilted relative to cable 26 to avoid an obstructing component (not shown) for example at the termination of cable 26. Referring to FIGS. 34 and 35, cover exit guide 177 may comprise more than one guide, such as roller elements 179A and 179B. Roller element 179B may have its axis angled, for example perpendicular, relative to the axis of roller element 179A.

Referring to FIG. 4, applicator 50 may be provided in combination with a hot stick tool 178 for maintaining control over a free portion, such as free end 180, of the conductor cover 10 positioned upstream of the applicator 50 in use. Tool 178 may also be used to guide free end 180 of the conductor cover 10 into the applicator 50 in use. Referring to FIG. 27 a method of use of hot stick tool 178 with applicator 50 is disclosed. Referring to FIG. 4, in a stage 104 (shown in FIG. 27), a free end 180 or portion of the conductor cover 10 is guided with hot stick tool 178. Tool 178 may be a hot stick tool suited to grip conductor cover 10. In a stage 106 (shown in FIG. 27), an end 182 of the conductor cover 10 is applied to the cable 26 with a conductor cover applicator 10. Thus, hot stick tool 178 may be used to guide cover 10 into applicator 50 during use. Because of the rigidity of some types of cover 10, this method may be advantageous in allowing cover 10 to pass through head 52 with less drag and without binding or catching.

Referring to FIG. 37, channel 82 may be shaped to impart reverse curl on one or more of edges 12 and 14 at cover exit end 176 of head 52. For example, an inside surface 193 of terminal end 185 of channel 82 may curve outward and terminal end 185 may be adapted to become shorter in length relative to terminal end 189 nearer to exit end 176 of applicator 50, thus forcing edge 12 to reverse curl as shown. In another embodiment (not shown), the channel itself may have a reverse curl profile at one or more of terminal ends 189 and 185 to impart the reverse curl. Reverse curl is understood as curling in a direction opposite to the natural direction of curl of cover 10. Referring to FIG. 36, reverse curl is observed at portion 187 of cover 10. Referring to FIG. 37, thus, the chances that edge 14 will curl inward on itself upon exit from applicator 50 are reduced. In addition, reverse curling of edge 14 may aid in positioning edge 14 overtop of edge 12 upon closing of the cover 10 (FIG. 36).

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

The embodiments of the invention in which an exclusive property or privileges is claimed are defined as follows:

1. An applicator for applying a tubular dielectric conductor cover to a cable, the conductor cover being split longitudinally to define a first longitudinal edge and a second longitudinal edge, the applicator comprising:
   a head having a separator shaped to contact, in operation of the applicator, an interior surface of the conductor cover to spread open the first longitudinal edge and the second longitudinal edge along a portion of the conductor cover to allow the portion of the conductor cover to be applied to a cable; and
   a drive system for one or both of driving and pulling the conductor cover through the head.

2. The applicator of claim 1 in which the head further comprises a roller element having a roller surface for contacting and guiding the conductor cover through the head in operation.

3. The applicator of claim 2 in which the roller surface comprises conductor cover gripping element.

4. The applicator of claim 2 further comprising a biasing mechanism for biasing the roller element towards the conductor cover in use.

5. The applicator of claim 2 further comprising an actuator lever for advancing and retracting the roller element towards and away from, respectively, the cover in use.

6. The applicator of claim 2 in which the roller surface is positioned for contacting an exterior surface of the conductor cover to hold the portion of the conductor cover against the separator.

7. The applicator of claim 2 in which the roller surface is one or more of at least partially concave or at least partially convex.

8. The applicator of claim 2 in which the roller surface is positioned for contacting the interior surface of the portion of conductor cover.

9. The applicator of claim 2 in which at least one roller element is connected for rotation to the drive system.

10. The applicator of claim 9 in which the drive system comprises a drive shaft made at least partially out of dielectric material.

11. The applicator of claim 1 in which the head and the separator define a channel contoured to fit the portion of the conductor cover.

12. The applicator of claim 11 in which the channel is a U-channel.

13. The applicator of claim 11 in which the channel comprises one or more spacer elements.

14. The applicator of claim 13 in which one or more spacer elements are adjustable.

15. The applicator of claim 11 in which the channel is shaped to impart reverse curl on one or more of the first longitudinal edge and the second longitudinal edge at a cover exit end of the head.

16. The applicator of claim 1 further comprising a handle for positioning the head.

17. The applicator of claim 16 in which the handle comprises a hot stick stock made at least partially of a dielectric material.

18. The applicator of claim 16 in which the head is one or more of connected to, pivotally connected to, and suspended from, the handle.

19. The applicator of claim 1 in which the separator converges inwardly to define a wedge element for spreading the first longitudinal edge and the second longitudinal edge apart during axial movement of the conductor cover through the head.

20. The applicator of claim 1 in which the separator further comprises two or more separating elements spaced to contact the interior surface of the conductor cover.

21. The applicator of claim 1 in which a cable passage is at least partially defined by the separator.

22. The applicator of claim 21 further comprising a gate having an at least partially closed position and being shaped to guide, when in the at least partially closed position, the first longitudinal edge at least partially across the cable passage and under or over the second longitudinal edge as the conductor cover exits the applicator.

23. The applicator of claim 22 in which the gate comprises one or more cover edge guide ridges for restricting the first longitudinal edge from curling back on itself.

24. The applicator of claim 23 in which one or more of the cover edge guide ridges is angled across the cable passage with increasing distance across the cable passage towards an exit end of the gate.

25. The applicator of claim 21 in which the gate is a first gate and further comprising a second gate having an at least partially closed position and being shaped to guide, when in the at least partially closed position, the second longitudinal edge at least partially across the cable passage as the conductor cover exits the applicator, in which the first gate and the second gate overlap when in the respective at least partially closed positions.

26. The applicator of claim 1 further comprising a cover exit guide for in use pressing the conductor cover towards the cable upon exit from the applicator.

27. The applicator of claim 26 in which the cover guide comprises a roller element.

28. The applicator of claim 1 in combination with a hot stick tool for maintaining control over a free portion of the conductor cover positioned upstream of the applicator in use.

29. The applicator of claim 1 in combination with conductor cover that is split longitudinally to have an overlapping portion defined by the first longitudinal edge and the second longitudinal edge.

30. The applicator of claim 1 in which the separator converges inwardly at a cover exit end of the head for closing the first longitudinal edge and the second longitudinal edge together about the cable during axial movement of the conductor cover through the head.

\* \* \* \* \*